(12) United States Patent
Wang et al.

(10) Patent No.: US 12,216,876 B2
(45) Date of Patent: Feb. 4, 2025

(54) TOUCH STRUCTURE AND TOUCH DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Wei Wang, Beijing (CN); Siyu Wang, Beijing (CN); Tianci Chen, Beijing (CN); Yi Zhang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/559,341

(22) PCT Filed: Feb. 22, 2023

(86) PCT No.: PCT/CN2023/077590
§ 371 (c)(1),
(2) Date: Nov. 7, 2023

(87) PCT Pub. No.: WO2023/179282
PCT Pub. Date: Sep. 28, 2023

(65) Prior Publication Data
US 2024/0231554 A1 Jul. 11, 2024

(30) Foreign Application Priority Data
Mar. 23, 2022 (CN) .......................... 202210290597.2

(51) Int. Cl.
*G06F 3/044* (2006.01)

(52) U.S. Cl.
CPC .......... *G06F 3/0448* (2019.05); *G06F 3/0446* (2019.05); *G06F 2203/04102* (2013.01)

(58) Field of Classification Search
CPC .... G06F 3/0448; G06F 3/0446; G06F 3/0443; G06F 3/0445; G06F 3/04164; G06F 3/0447; G06F 2203/04102
See application file for complete search history.

(56) References Cited

U.S. PATENT DOCUMENTS

2012/0062504 A1 3/2012 Kim et al.
2015/0242017 A1* 8/2015 Liao ...................... G06F 3/0446
29/846

(Continued)

FOREIGN PATENT DOCUMENTS

CN 105094495 A 11/2015
CN 107390920 A 11/2017

(Continued)

*Primary Examiner* — Mihir K Rayan
(74) *Attorney, Agent, or Firm* — IP & T GROUP LLP

(57) ABSTRACT

A touch structure includes a plurality of electrode plates, the plurality of electrode plates are located on a same virtual reference plane, and each electrode plate has a sensing surface. A minimum enclosed pattern region where a whole of the plurality of electrode plates is located is a touch region. The plurality of electrode plates include a plurality of first electrode plates, each first electrode plate has a designated edge, the designated edge constitutes a part of a boundary of the touch region, and at least one designated edge is arc-shaped. An area of a sensing surface of each first electrode plate is in a range of 10 mm² to 35 mm².

20 Claims, 9 Drawing Sheets

(56) References Cited

U.S. PATENT DOCUMENTS

| | | | |
|---|---|---|---|
| 2017/0307924 A1 | 10/2017 | Liu et al. | |
| 2018/0068156 A1 | 3/2018 | Jang et al. | |
| 2018/0107330 A1 | 4/2018 | Meng | |
| 2019/0258343 A1* | 8/2019 | Hwang | G06F 3/0445 |
| 2020/0012371 A1 | 1/2020 | Yang et al. | |
| 2020/0210027 A1* | 7/2020 | Ma | G06F 3/04166 |
| 2020/0257430 A1* | 8/2020 | Hatano | G06F 3/04186 |
| 2022/0100322 A1 | 3/2022 | Deng et al. | |
| 2022/0300116 A1 | 9/2022 | Zhang et al. | |

FOREIGN PATENT DOCUMENTS

| | | |
|---|---|---|
| CN | 109032403 A | 12/2018 |
| CN | 105930012 B | 4/2019 |
| CN | 109725771 A | 5/2019 |
| CN | 110120187 A | 8/2019 |
| CN | 112905058 A | 6/2021 |
| CN | 113093931 A | 7/2021 |
| CN | 113190140 A | 7/2021 |
| CN | 114564128 A | 5/2022 |
| CN | 217386338 U | 9/2022 |

\* cited by examiner

TOUCH STRUCTURE AND TOUCH DISPLAY APPARATUS

CROSS-REFERENCE TO RELATED APPLICATIONS

This application is a national phase entry under 35 USC 371 of International Patent Application No. PCT/CN2023/077590, filed on Feb. 22, 2023, which claims priority to Chinese Patent Application No. 202210290597.2, filed on Mar. 23, 2022, which are incorporated herein by reference in their entirety.

TECHNICAL FIELD

The present disclosure relates to the field of touch technologies, and for example, to a touch structure and a touch display apparatus.

BACKGROUND

In the related art, the touch structure is usually used to detect touch positions. However, an edge of the touch structure has poor detection accuracy for the touch position, which affects the accuracy and reliability of the touch structure.

SUMMARY

In an aspect, a touch structure is provided. The touch structure includes a plurality of electrode plates. The plurality of electrode plates are located on a same virtual reference plane, and each electrode plate having a sensing surface. A smallest enclosed pattern region where a whole of the plurality of electrode plates is located is a touch region. The plurality of electrode plates include a plurality of first electrode plates. Each first electrode plate has a designated edge, and the designated edge constitutes a part of a boundary of the touch region. At least one designated edge is arc-shaped. An area of a sensing surface of each first electrode plate is in a range of 10 mm$^2$ to 35 mm$^2$.

In some embodiments, the plurality of electrode plates further include a plurality of second electrode plates. The plurality of second electrode plates are located on a side of the plurality of first electrode plates away from the boundary of the touch region. An area of a sensing surface of each second electrode plate is in a range of 10 mm$^2$ to 40 mm$^2$.

In some embodiments, a ratio of the area of the sensing surface of the first electrode plate to the area of the sensing surface of the second electrode plate is in a range of 0.6 to 1.5.

In some embodiments, the ratio of the area of the sensing surface of the first electrode plate to the area of the sensing surface of the second electrode plate is in a range of 0.95 to 1.05.

In some embodiments, an orthogonal projection of each second electrode plate on the virtual reference plane is in a shape of a polygon.

In some embodiments, the plurality of first electrode plates include a first irregular electrode plate and a second irregular electrode plate. The first irregular electrode plate includes a first arc edge, a first edge and a second edge, and the first arc edge is a designated edge of the first irregular electrode plate. The first edge of the first irregular electrode plate is connected to an end of the first arc edge, and the second edge of the first irregular electrode plate is connected to another end of the first arc edge. An end of the first edge of the first irregular electrode plate away from the first arc edge is connected to an end of the second edge of the first irregular electrode plate away from the first arc edge, and the first edge of the first irregular electrode plate is perpendicular to the second edge of the first irregular electrode plate. The second irregular electrode plate is disposed adjacent to the first edge of the first irregular electrode plate. The second irregular electrode plate and the first edge of the first irregular electrode plate have a first gap therebetween. Each second electrode plate is in a shape of a square, and the plurality of second electrode plates include a first square electrode plate and a second square electrode plate. The first square electrode plate is disposed adjacent to the second edge of the first irregular electrode plate, and the second square electrode plate is disposed adjacent to both the first square electrode plate and the second irregular electrode plate. The second square electrode plate and the first square electrode plate have a second gap therebetween, and the second gap and the first gap are located on a same straight line.

In some embodiments, an area of a sensing surface of the first irregular electrode plate is smaller than an area of a sensing surface of the second irregular electrode plate.

In some embodiments, a length of an edge of each second electrode plate is in a range of 3.17 mm to 6.32 mm.

In some embodiments, the plurality of first electrode plates includes a third irregular electrode plate, a fourth irregular electrode plate and a fifth irregular electrode plate. The third irregular electrode plate includes a second arc edge, a first edge and a second edge, and the second arc edge is a designated edge of the third irregular electrode plate. The first edge of the third irregular electrode plate is connected to an end of the second arc edge, the second edge of the third irregular electrode plate is connected to another end of the second arc edge, and a direction in which the first edge of the third irregular electrode plate extends is perpendicular to a direction in which the second edge of the third irregular electrode plate extends. The fourth irregular electrode plate is disposed adjacent to the first edge of the third irregular electrode plate. The fifth irregular electrode plate is disposed adjacent to the second edge of the third irregular electrode plate.

In some embodiments, each second electrode plate is in a shape of a square, and a length of an edge of each second electrode plate is in a range of 5 mm to 6 mm.

In some embodiments, the third irregular electrode plate further includes a third edge and a fourth edge. The third edge of the third irregular electrode plate is connected to an end of the first edge of the third irregular electrode plate away from the second arc edge, and the fourth edge of the third irregular electrode plate is connected to an end of the second edge of the third irregular electrode plate away from the second arc edge. An end of the third edge of the third irregular electrode plate away from the first edge of the third irregular electrode plate is connected to an end of the fourth edge of the third irregular electrode plate away from the second edge of the third irregular electrode plate, and the third edge of the third irregular electrode plate is perpendicular to the fourth edge of the third irregular electrode plate. The plurality of second electrode plates include a first rectangular electrode plate, a second rectangular electrode plate, and a third square electrode plate. The first rectangular electrode plate is disposed adjacent to the third edge of the third irregular electrode plate. The second rectangular electrode plate is disposed adjacent to the fourth edge of the third irregular electrode plate. The third square electrode plate is disposed adjacent to both the first rectangular electrode plate and the second rectangular electrode plate.

In some embodiments, a length of the third edge of the third irregular electrode plate is the same as a length of an edge of the first rectangular electrode plate proximate to the third irregular electrode plate, and a length of the fourth edge of the third irregular electrode plate is the same as a length of an edge of the second rectangular electrode plate proximate to the third irregular electrode plate.

In some embodiments, an area of a sensing surface of the third square electrode plate is smaller than an area of a sensing surface of the first rectangular electrode plate, and the area of the sensing surface of the third square electrode plate is smaller than an area of a sensing surface of the second rectangular electrode plate.

In some embodiments, an area of a sensing surface of at least one first electrode plate is the same as an area of a sensing surface of at least one second electrode plate.

In some embodiments, the plurality of first electrode plates include a sixth irregular electrode plate, a seventh irregular electrode plate and an eighth irregular electrode plate. The sixth irregular electrode plate includes a third arc edge, a first edge and a second edge, and the third arc edge is a designated edge of the sixth irregular electrode plate. The first edge of the sixth irregular electrode plate is connected to an end of the third arc edge, the second edge of the sixth irregular electrode plate is connected to another end of the third arc edge, and the first edge of the sixth irregular electrode plate is parallel to the second edge of the sixth irregular electrode plate. The seventh irregular electrode plate is disposed adjacent to the first edge of the sixth irregular electrode plate. The eighth irregular electrode plate is disposed adjacent to the second edge of the sixth irregular electrode plate.

In some embodiments, each second electrode plate is in a shape of a square, and a length of an edge of each second electrode plate is in a range of 4 mm to 4.2 mm.

In some embodiments, the first electrode plates are each in a shape of a ring sector, and the second electrode plates are each in a shape of a sector.

In some embodiments, the plurality of first electrode plates are all in sector shapes.

In some embodiments, the touch structure further includes a plurality of touch leads. A single touch lead is electrically connected to a single electrode plate. The plurality of touch leads are led out to outside of the touch region along gaps between the plurality of electrode plates. Alternatively, the touch structure further includes a plurality of touch leads and an insulating layer. A single touch lead is electrically connected to a single electrode plate. The insulating layer is located between the plurality of electrode plates and the plurality of touch leads in a direction perpendicular to the virtual reference plane. The insulating layer is provided with a plurality of via holes therein, and the single touch lead is electrically connected to the single electrode plate through at least one via hole.

In another aspect, a touch display apparatus is provided. The touch display apparatus includes a display panel and the touch structure as described in any of the above embodiments. The touch structure is disposed on a display surface of the display panel.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, but are not limitations on actual sizes of products, actual processes of methods and actual timings of signals involved in the embodiments of the present disclosure.

DETAILED DESCRIPTION

Figure 1:
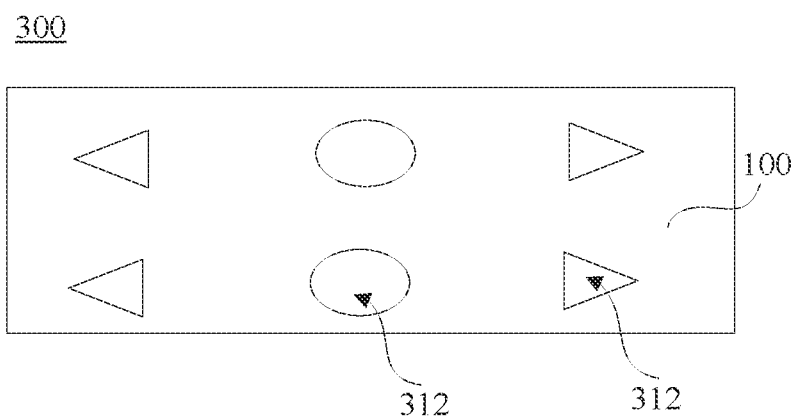
FIG. 1 is a structural diagram of an electronic device, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "connected" and derivatives thereof may be used. For example, the term "connected" may be used in the description of some embodiments to indicate that two or more components are in direct physical or electrical contact with each other. The embodiments disclosed herein are not necessarily limited to the content herein.

The term "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

The term such as "parallel" or "perpendicular" as used herein includes a stated condition and a condition similar to the stated condition. A range of the similar condition is within an acceptable range of deviation. The acceptable range of deviation is determined by a person of ordinary skill in the art in view of measurement in question and errors associated with the measurement of a particular quantity (i.e., limitations of the measurement system). For example, the term "parallel" includes absolute parallelism and approximate parallelism, and an acceptable range of deviation of the approximate parallelism may be a deviation within 5°; and the term "perpendicular" includes absolute perpendicularity and approximate perpendicularity, and an acceptable range of deviation of the approximate perpendicularity may also be a deviation within 5°.

As used herein, the term "same" may be exactly the same or approximately the same.

It will be understood that when a layer or element is referred to as being on another layer or substrate, the layer or element may be directly on the another layer or substrate, or there may be intermediate layer(s) between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

FIG. 1 is a structural diagram of an electronic device 300 in accordance with some embodiments. Referring to FIG. 1, some embodiments of the present disclosure provide an electronic device 300. The electronic device 300 may include a smart access control, a music player, a washing machine, an air conditioner, a refrigerator, and other electronic products with touch function. Embodiments of the present disclosure do not further limit a form of the display device 300, and a structure of the display device 300 will be described exemplarily below.

As shown in FIG. 1, the electronic device 300 includes a touch structure 100 and a plurality of touch buttons 312, and the plurality of touch buttons 312 respectively correspond to different regions of the touch structure 100. It can be understood that, the touch buttons 312 are used to guide a user to perform touch operations on different positions of the touch structure 100.

The touch structure 100 can detect a touch position and convert the touch position into an electrical signal. In this way, an operating state of the electronic device 300 may be controlled, for example, start, stop, temperature rise or temperature drop of the electronic device 300 is controlled, according to the electrical signal output by the touch structure 100, so that the electronic device 300 may realize different function, thereby improving convenience of use of the electronic device 300.

In addition, FIG. 1 illustrates six touch buttons 312 as an example, but the present disclosure does not limit the number and positions of the touch buttons 312. In some other embodiments, the number of the touch buttons 312 may also be one, two, three, four, five, seven or more. Moreover, the touch button 312 may be located at a border of the touch structure 100 or at the middle of the touch structure 100.

Figure 2:
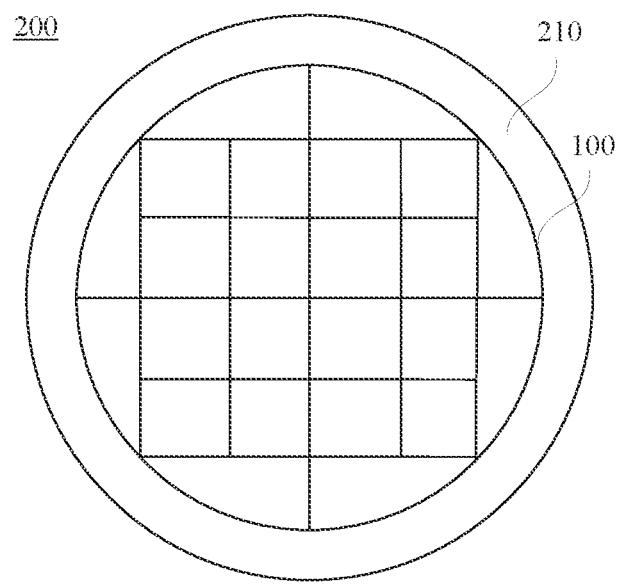
FIG. 2 is a structural diagram of a touch display apparatus, in accordance with some embodiments.

FIG. 2 is a structural diagram of a touch display apparatus 200 in accordance with some embodiments. Referring to FIG. 2, some embodiments of the present disclosure provide a touch display apparatus 200. It can be understood that the touch display apparatus 200 is also an electronic device.

For example, the touch display apparatus 200 may be a mobile phone, a tablet computer, a television, a smart wearable product (e.g., a smart watch or a smart wristband), a virtual reality terminal device, an augmented reality terminal device, and other electronic products with image display function.

It can be understood that, the touch display apparatus 200 can display dynamic images such as a video or game screens, and can also display static images such as pictures. Embodiments of the present disclosure do not further limit the touch display apparatus 200, and a structure of the touch display apparatus 200 will be exemplarily described below.

As shown in FIG. 2, the touch display apparatus 200 includes a display panel 210 and a touch structure 100. The display panel 210 is used to display images, and the touch structure 100 is used to detect touch positions.

The display panel 210 has a display surface, and the display surface is used for displaying images. The display panel 210 may be a liquid crystal display (LCD) panel, and may also be an organic light-emitting diode (OLED) display panel or a quantum dot light-emitting diode (QLED) display panel.

In some embodiments, the display panel 210 may be in a shape of a square, a circle, a polygon or other irregular shapes, which improves flexibility of the touch display apparatus 200.

The touch structure 100 is disposed on the display surface of the display panel 210. It can be understood that the touch structure 100 is made of a transparent material, which may avoid blocking images displayed on the display surface. In addition, the touch structure 100 can detect the touch position, and convert the touch position into the electrical signal for output, so that the touch display apparatus 200 can realize the touch function.

In some embodiments, the display panel 210 includes a display region and a peripheral region. The display region is used for displaying images, and the peripheral region is used for providing connection lines and bonding a flexible printed circuit (FPC). For example, the touch structure 100 is located in the display region of the display panel 210, and is electrically connected to a main control circuit board by connection lines and FPC.

In some embodiments, a shape and an area of the touch structure 100 may be the same as that of the display region.

In some embodiments, the touch display apparatus 200 may further include a touch chip (integrated circuit, IC). The touch IC may be disposed on the peripheral region of the display panel 210, or may also be disposed on the FPC or the main control circuit board, so as to receive the electrical signal output by the touch structure 100 and process the electrical signal. In this way, the display content of the display panel 210 may be controlled according to the electrical signal output by the touch structure 100, thereby improving the convenience of use of the touch display apparatus 200.

It can be seen from the above that the touch structure 100 can detect the touch position. For example, the touch structure 100 can detect the position touched by a human finger. The following will exemplarily describe a principle of detecting the touch position by the touch structure 100 by considering an example of the touch structure 100 detecting the touch position of the human finger.

In some embodiments, the touch structure 100 may be a self-capacitive capacitance touch structure. The self-capacitive capacitance touch structure includes a plurality of electrode plates arranged in an array, and all the electrode plates are insulated from each other. Each electrode plate and the ground can have capacitance therebetween. When the human finger touches any electrode plate, capacitance of the human finger will be superimposed on the corresponding electrode plate, thereby changing a capacitance value between the electrode plate and the ground. In this way, a touch position of the human finger may be determined by obtaining the capacitance value between each electrode plate and the ground, and the touch position may be converted into an electrical signal, so that the touch structure 100 may realize the position detection function.

Figure 3A:
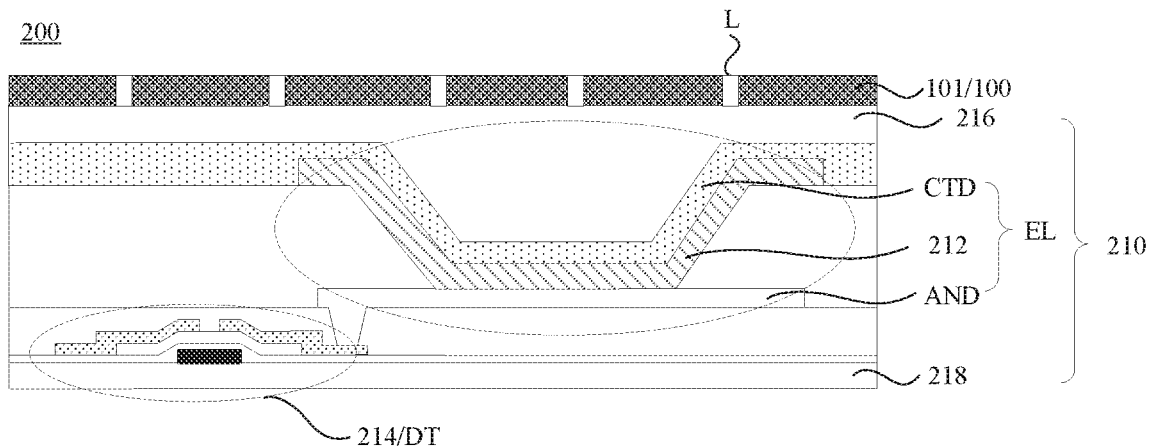
FIG. 3A is a structural diagram of another touch display apparatus, in accordance with some embodiments.

FIG. 3A is a structural diagram of another touch display apparatus 200 in accordance with some embodiments. Referring to FIG. 3A, a positional relationship between the touch structure 100 and the display panel 210 will be exemplarily described.

In some embodiments, as shown in FIG. 3A, the display panel 210 includes a substrate 218, a light-emitting device EL and an encapsulation layer 216.

In some examples, the substrate 218 may be a rigid substrate or a flexible substrate. For example, a material of the substrate 218 includes any of plastic, FR-4 grade material, resin, glass, quartz, polyimide, or polymethyl methacrylate (PMMA).

The light-emitting device EL is located on a side of the substrate 218. It can be understood that, the light-emitting device EL is used for emitting light. There are a plurality of light-emitting devices EL, and the plurality of light-emitting devices EL are arranged in an array. In some examples, the plurality of light-emitting devices EL are used for emitting white light. In some other examples, the plurality of light-emitting devices EL are used for emitting blue light. In yet other examples, in the plurality of light-emitting devices EL, a part of light-emitting devices EL are used for emitting red light, another part of light-emitting devices EL are used for emitting blue light, and yet another part of light-emitting devices EL are used for emitting green light.

In some examples, the light-emitting device EL includes an anode layer AND, a cathode layer CTD, and a light-emitting layer 212. The anode layer AND is located on a side of the substrate 218, the light-emitting layer 212 is located on a side of the anode layer AND away from the substrate 218, and the cathode layer CTD is located on a side of the light-emitting layer 212 away from the anode layer AND.

For example, a material of the light-emitting layer 212 includes electroluminescent materials. It can be understood that the electroluminescence refers to the phenomenon that organic semiconductor materials are driven by an electric field to form excitons through injection of carriers, transport of carriers, and combination of electrons and holes, and then radiative recombination to emit light. A material of the anode layer AND includes metal, such as copper or silver. The cathode layer CTD is made of a transparent material, such as transparent indium tin oxide (ITO) or transparent indium zinc oxide (IZO), so that light emitted by the light-emitting layer 212 may exit through the cathode layer CTD. For example, the display panel 210 in the above arrangement may be called a top-emission display panel.

In some examples, in a direction from the anode layer AND to the light-emitting layer 212, at least one of a hole injection layer (HIL), a hole transport layer (HTL) and an electron blocking layer (EBL) is provided between the anode layer AND and the light-emitting layer 212. In a direction from the cathode layer CTD to the light-emitting layer 212, at least one of an electron injection layer (EIL), an electron transport layer (ETL) and a hole blocking layer (HBL) is provided between the cathode layer CTD and the light-emitting layer 212. Thus, luminescence reliability of the light-emitting device EL may be improved.

The encapsulation layer 216 is located on a side of the plurality of light-emitting devices EL away from the substrate 218. It can be understood that the encapsulation layer 216 is used for encapsulating and protecting the light-emitting devices EL. For example, a material of the encapsulation layer 216 includes an organic material.

In some examples, the display panel 210 further includes driving circuits 214. The driving circuit 214 includes a driving transistor DT, and the driving transistor DT is electrically connected to a light-emitting device EL, so that the light-emitting device EL can emit light due to driving action of the driving circuit 214. For example, the driving transistor DT may be a thin film transistor (TFT).

In some embodiments, as shown in FIG. 3A, the touch structure 100 is located on a surface of the encapsulation layer 216 away from the substrate 218. For example, a structure of the touch structure 100 being located on the surface of the encapsulation layer 216 away from the substrate 218 may be called a flexible multi-layer on cell (FMLOC) structure.

Figure 3B:
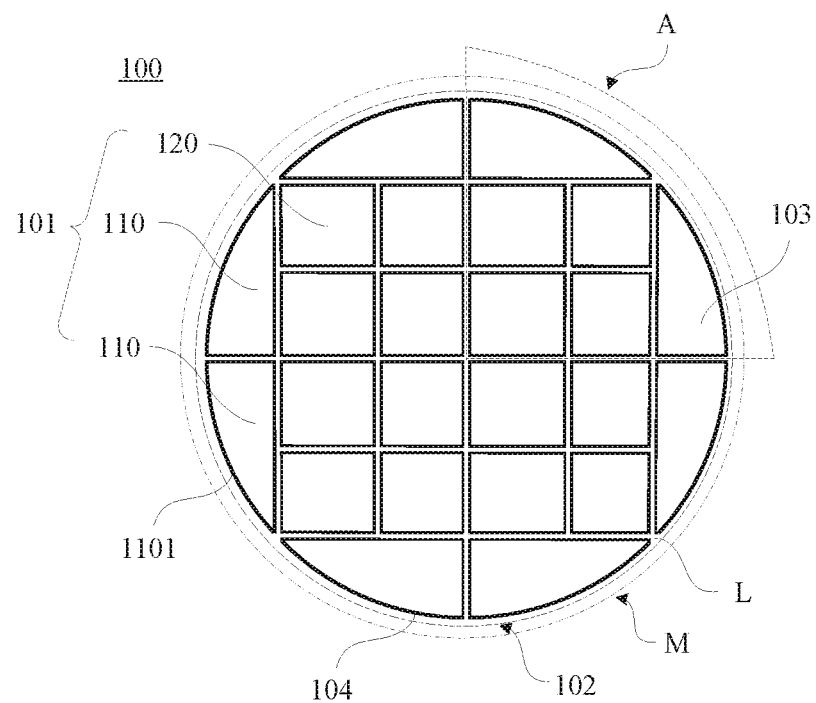
FIG. 3B is a structural diagram of a touch structure, in accordance with some embodiments.
Figure 4:
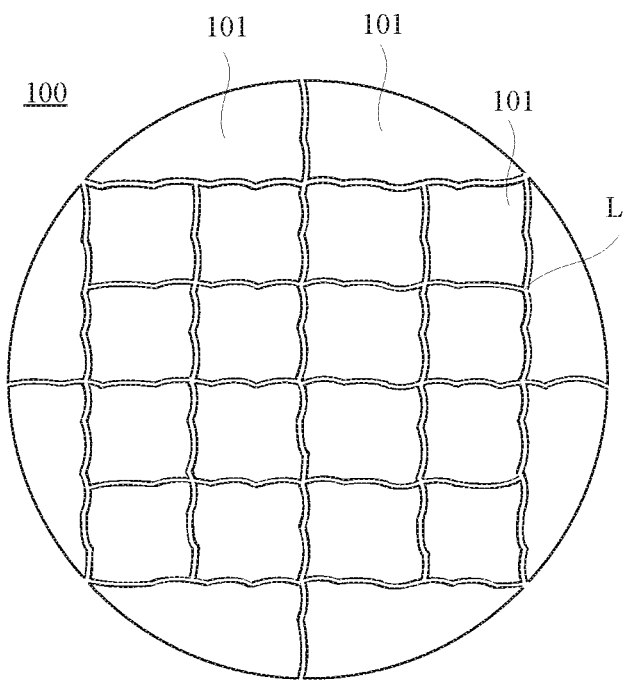
FIG. 4 is a structural diagram of another touch structure, in accordance with some embodiments.
Figure 5:
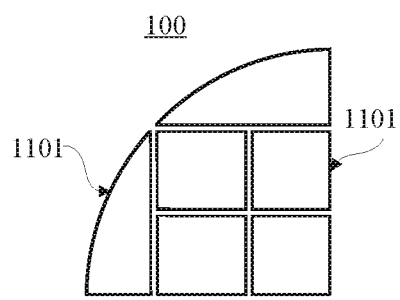
FIG. 5 is a structural diagram of yet another touch structure, in accordance with some embodiments.

FIG. 3B is a structural diagram of a touch structure 100 in accordance with some embodiments. FIG. 4 is a structural diagram of another touch structure 100 in accordance with some embodiments. FIG. 5 is a structural diagram of yet another touch structure 100 in accordance with some embodiments. The structure of the touch structure 100 will be exemplarily illustrated below with reference to FIGS. 3B to 5.

In some embodiments, as shown in FIG. 3B, the touch structure 100 includes a plurality of electrode plates 101. For example, the plurality of electrode plates 101 are arranged in an array of a grid on the surface of the encapsulation layer 216 away from the substrate 218.

It can be understood that any electrode plate 101 and the ground may have capacitance. It can be seen from the above that the touch structure 100 may be made of a transparent material. Therefore, in some embodiments, a material of the electrode plate 101 may be transparent indium tin oxide (ITO), transparent indium zinc oxide (IZO), or the like.

Referring to FIG. 3B, the plurality of electrode plates 101 are located on a same virtual reference plane M. It can be understood that, the virtual reference plane M is a reference surface that does not actually exist, and is used to draw out an arrangement relationship between the plurality of electrode plates 101. In some embodiments, the virtual reference plane M may be a plane (as shown in FIG. 3B). In some other embodiments, the virtual reference plane M may be a curved surface. In yet other embodiments, the virtual reference plane M may also include a plane and a curved surface together. In this way, the touch structure 100 may be applied not only to a flat display panel 210 but also to a display panel 210 including a curved surface, which may improve applicability of the touch structure 100.

The plurality of electrode plates 101 are arranged adjacently. It can be understood that, the plurality of electrode plates 101 are insulated from each other, so as to avoid mutual influence of capacitance between different electrode plates 101. In some embodiments, as shown in FIG. 3B, there is a gap L between the plurality of electrode plates 101, so that the plurality of electrode plates 101 may be insulated from each other.

In some embodiments, as shown in FIG. 3B, edges of two electrode plates 101 adjacent to each other may be straight lines, so that the gap L between the two adjacent electrode plates 101 may be in a shape of a straight line. In some other embodiments, as shown in FIG. 4, edges of two electrode plates 101 adjacent to each other may be curved lines, such as wavy lines or arcs, so that the gap L between the two adjacent electrode plates 101 may be in a wavy or curved shape, which may reduce the risk of the gap L being recognized by the naked eye, that is, reduce the risk of visible patterns appearing on the display panel 210 or the electronic device 300, thereby improving the reliability of the touch display apparatus 200.

As shown in FIG. 3B, a smallest enclosed pattern region where a whole of the plurality of electrode plates 101 are located is a touch region 102. It can be understood that, the touch region 102 includes the plurality of electrode plates 101 and gaps L between the plurality of electrode plates 101. A touch operation in the touch region 102 can be detected by the touch structure 100 and converted into an electrical signal. In some embodiments, the touch region 102 may be in a shape of a circle.

A surface of each electrode plate 101 away from the virtual reference plane M is a sensing surface 103. It can be understood that, the sensing surface 103 is the surface of the electrode plate 101 away from the display panel 210. The sensing surface 103 is used to sense coupling capacitance brought by touch, so that the touch structure 100 may detect the touch position. In some embodiments, the sensing surface 103 has a same area as the electrode plates 101.

As shown in FIG. 3B, the plurality of electrode plates 101 includes a plurality of first electrode plates 110. Each first electrode plate 110 has a designated edge 1101, and the designated edge 1101 constitutes a part of a boundary 104 of the touch region 102, that is, the first electrode plate 110 is disposed at a border of the touch structure 100.

It can be understood that the boundary 104 of the touch region 102 includes designated edges 1101 of all the first electrode plates 110 and virtual edges each connected between two adjacent designated edges 1101. It will be noted that any virtual edge may have the same trend as a designated edge 1101 connected to the virtual edge, for example, the two may have the same curvature or may extend along the same straight line.

It will be noted that the separation of the designated edge 1101 and the boundary of the touch region 102 in FIG. 3B is only for convenience of displaying the touch region 102, and does not limit a positional relationship between the designated edge 1101 and the boundary of the touch region 102.

At least one designated edge 1101 is arc-shaped. It can be understood that in the embodiments of the present disclosure, the arc-shape includes not only circular arc-shape, but also other curved arc-shape. In some embodiments, some designated edges 1101 may be arc-shaped, and other designated edges 1101 may be in a straight or wavy shape. In some other embodiments, all the designated edges 1101 may be arc-shaped.

In some embodiments, as shown in FIG. 3B, the designated edge 1101 of each first electrode plate 110 is arc-shaped, so that the designated edges 1101 of the plurality of first electrode plates 110 may surround to form a circular touch region 102. In some other embodiments, as shown in FIG. 5, designated edges 1101 of part of the first electrode plates 110 are arc-shaped, and designated edges 1101 of the other part of the first electrode plates 110 are in a straight shape, so that the plurality of first electrode plates 110 may form a fan-shaped touch region 102.

It can be understood that in a case where an area of a sensing surface 103 of the first electrode plate 110 is too large, accuracy of the touch position detected by the first electrode plate 110 may decrease. Since the first electrode plate 110 is disposed at the border of the touch structure 100, the accuracy of the touch position detected by the border of the touch structure 100 may be reduced, thereby affecting the reliability of the touch structure 100. The principle that the area of the sensing surface 103 of the first electrode plate 110 is too large and thus cause a decrease in the accuracy of the touch position detected by the first electrode plate 110 will be described below.

Considering an example where the touch structure 100 is the self-capacitive capacitance touch structure, the area of the sensing surface 103 of the first electrode plate 110 is too large, and thus the capacitance value between the first electrode plate 110 and the ground will increase, thereby reducing the coupling capacitance caused by the touch of the human finger, which may affect the capacitance value between the first electrode plate 110 and the ground. In this way, the difficulty of detecting the touch position of the human finger may increase, thereby affecting the accuracy of the touch position detected by the first electrode plate 110.

Figure 6:
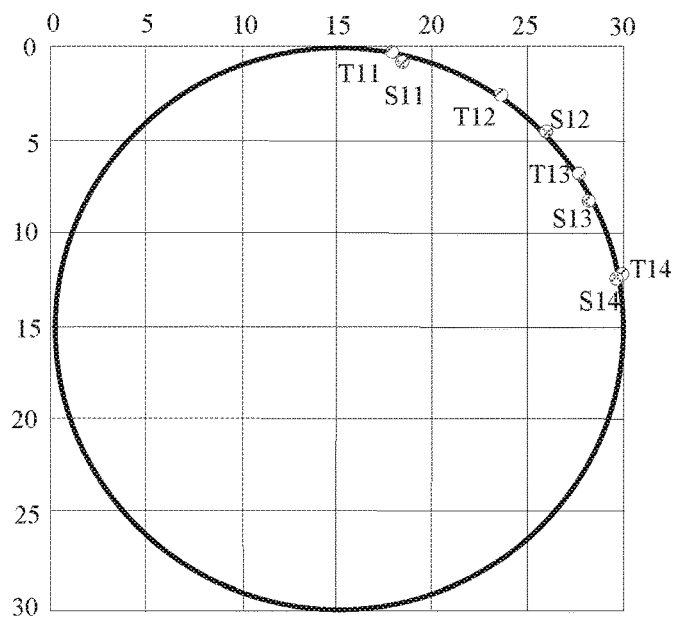
FIG. 6 is a diagram showing a simulation result of region A in FIG. 3B.

FIG. 6 is a diagram showing a simulation result of a region A in FIG. 3B. The following will exemplarily describe the simulation result of the touch structure 100 in some embodiments of the present disclosure with reference to FIGS. 3B and 6.

For example, as shown in FIG. 3B, in some embodiments, the area of the sensing surface 103 of the first electrode plate 110 is too large, for example, greater than 35 mm². A simulation is performed on the region A of the touch structure 100, and the simulation result is shown in FIG. 6. In FIG. 6, points T are actual touch points, and points S are simulation points obtained by simulation. By considering four actual touch points of T11 to T14 as an example, a straight-line distance between the actual touch point T11 and the simulation point S11 is 0.55 mm, a straight-line distance between the actual touch point T12 and the simulation point S12 is 3.10 mm, a straight-line distance between the actual touch point T13 and the simulation point S13 is 1.49 mm, and a straight-line distance between the actual touch point T14 and the simulation point S14 is 0.34 mm.

It can be seen that, since the area of the sensing surface 103 of the first electrode plate 110 is too large (greater than 35 mm²), a maximum error value between the actual touch point T and the simulated point S reaches 3.10 mm, which affects the accuracy of the touch position detected by the border of the touch structure 100, and reduces the reliability of the touch structure 100.

It can be understood that in a case where the area of the sensing surface 103 of the first electrode plate 110 is too small, the touch of the human finger may cause capacitance values of multiple first electrode plates 110 to change, which also results in difficulty in positioning the touch position. In addition, in a case where the sensing surface 103 of the first electrode plate 110 is too small, for the touch region 102 of the same area, more first electrode plates 110 need to be provided. As a result, the amount of electrical signals output by the touch structure 100 increases, and the difficulty in processing the output electrical signals increases, thereby reducing the detection accuracy of the touch position.

It can be seen that if the area of the sensing surface 103 of the first electrode plate 110 is too large or too small, the accuracy of the touch position detected by the first electrode plate 110 will be affected, that is, the accuracy of the touch position detected by the border of the touch structure 100 may be affected.

Figure 7:
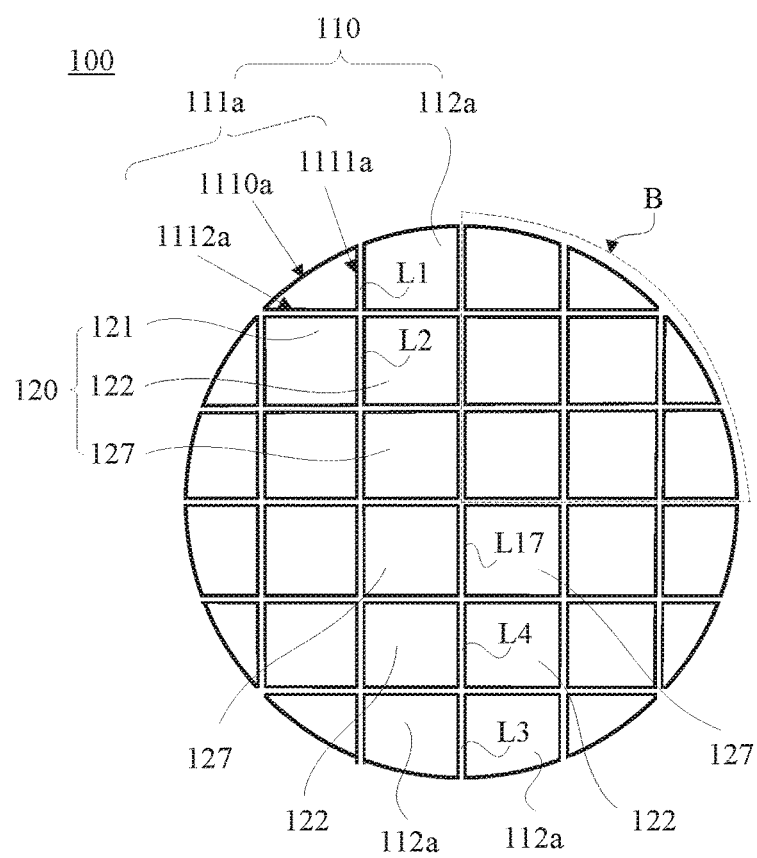
FIG. 7 is a structural diagram of yet another touch structure, in accordance with some embodiments.

FIG. 7 is a structural diagram of yet another touch structure 100 in accordance with some embodiments.

In some embodiments, as shown in FIG. 7, an area of a sensing surface 103 of each first electrode plate 110 is in a range of 10 mm² to 35 mm².

It can be understood that the area of the sensing surface 103 of each first electrode plate 110 is set to be in the range of 10 mm² to 35 mm², and thus the area of the sensing surface 103 of the first electrode plate 110 may be prevented from being too large (e.g., greater than 35 mm²), thereby avoiding the excessive capacitance value of the first electrode plate 110, increasing the influence of the coupling capacitance brought by the touch position on the capacitance value of the first electrode plate 110, reducing the difficulty in positioning the touch position by the first electrode plate 110, and improving the accuracy of the touch position detected by the first electrode plate 110.

Moreover, the area of the sensing surface 103 of the first electrode plate 110 may be prevented from being too small (e.g., less than 10 mm²), thereby avoiding the influence of the touch position on the capacitance values of the multiple first electrode plates 110, reducing the difficulty in positioning the touch position by the first electrode plate 110, and improving the accuracy of the touch position detected by the first electrode plate 110.

In addition, preventing the area of the sensing surface 103 of the first electrode plate 110 from being too small may further reduce the number of the first electrode plates 110 on a premise that the area of the touch region 102 remains unchanged, thereby reducing the amount of electrical signals output by the touch structure 100, reducing the difficulty in processing the electrical signals, and further improving the detection accuracy of the touch position. Moreover, reducing the number of the first electrode plates 110 may also simplify the structure, reduce the cost of the touch structure 100, and improve the production efficiency of the touch structure 100.

Since the designated edge 1101 of the first electrode plate 110 constitutes a part of the boundary 104 of the touch region 102, the first electrode plate 110 may be disposed at the edge of the touch structure 100. In this way, the area of the sensing surface 103 of the first electrode plate 110 is prevented from being too large or too small, so that the accuracy of the touch position detected by the first electrode plate 110 may be improved, and thus the accuracy of the touch position detected by the border of the touch structure 100 may be improved, thereby improving the reliability of the touch structure 100.

Figure 8:
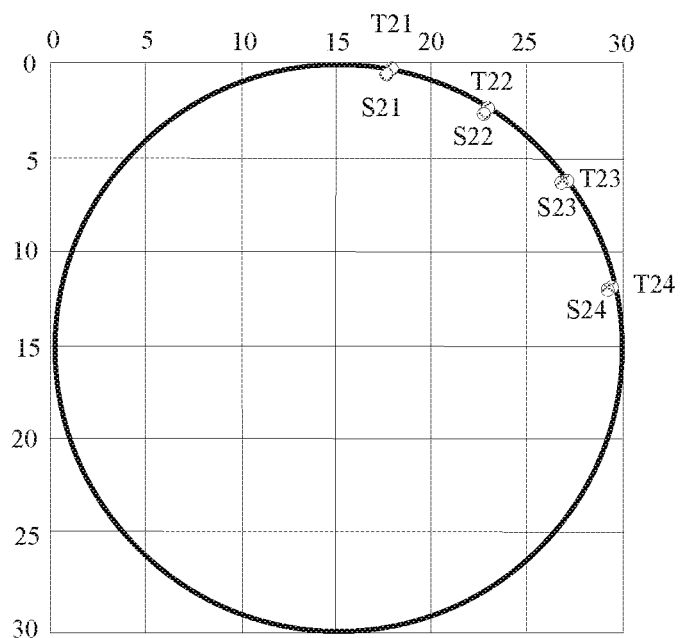
FIG. 8 is a diagram showing a simulation result of region B in FIG. 7.

FIG. 8 is a diagram showing a simulation result of a region B in FIG. 7. The following will exemplarily describe the simulation result of the touch structure 100 in some other embodiments of the present disclosure with reference to FIGS. 7 and 8.

For example, as shown in FIG. 7, a simulation is performed on the region B of the touch structure 100, and the simulation result is shown in FIG. 8. In FIG. 8, points T are actual touch points, and points S are simulation points obtained by simulation. By considering four actual touch points of T21 to T24 as an example, a straight-line distance between the actual touch point T21 and the simulation point S21 is 0.34 mm, a straight-line distance between the actual touch point T22 and the simulation point S22 is 0.30 mm, and a straight-line distance between the actual touch point T24 and the simulation point S24 is 0.29 mm.

It can be seen that the area of the sensing surface 103 of each first electrode plate 110 is set to be in the range of 10 mm² to 35 mm², so that a maximum error value between the actual touch point T and the simulated point S is reduced to 0.34 mm, and thus the accuracy of the touch position detected by the first electrode plate 110 may be improved significantly, that is, the accuracy of the touch position detected by the border of the touch structure 100 may be improved, thereby improving the reliability of the touch structure 100.

It can be understood that, the plurality of first electrode plate 110 may have the same or different shapes and the same or different areas of the sensing surface 103. In some embodiments, the area of the sensing surface 103 of the first electrode plate 110 may be in a range of 14.44 mm² to 35 mm², 18 mm² to 32 mm², 20 mm² to 30 mm², 22 mm² to 28 mm², or 24.5 mm² to 26.5 mm². For example, the area of the sensing surface 103 of the first electrode plate 110 may be 12 mm², 15 mm², 18 mm², 21 mm², 25 mm², 27 mm², 29 mm², 31 mm², or 33 mm².

In some embodiments, as shown in FIG. 3B, the touch structure 100 includes 24 electrode plates 101 in total. An electrode plate 101 is regarded as an electrical signal output channel. That is, the touch structure 100 has 24 channels. The number of the first electrode plates 110 is 8. In some other embodiments, as shown in FIG. 7, the touch structure 100 includes 32 electrode plates 101 in total. That is, the touch structure 100 has 32 channels. The number of the first electrode plates 110 is 16.

It can be seen that on the premise that the area of the touch region 102 remains unchanged, compared with the touch structure 100 shown in FIG. 3B, the number of the first electrode plate 110 increases, that is, the number of the channels at the border of the touch structure 100 increases, so that the area of the sensing surface 103 of each first electrode plate 110 may be reduced, thereby improving the accuracy of the touch position detected by the first electrode plate 110.

In some other embodiments, as shown in FIG. 7, the plurality of electrode plates 101 further includes a plurality of second electrodes 120. The plurality of second electrode plates 120 are located on a side of the plurality of first electrode plates 110 away from the boundary 104 of the touch region 102.

It can be understood that the plurality of second electrode plates 120 are located on the side of the plurality of first electrode plates 110 away from the boundary 104 of the touch region 102, that is, a side of the plurality of second electrode plates 120 away from the designated edges 1101 of the plurality of first electrode plates 110. As a result, the second electrode plates 120 may be disposed away from the borders of the touch structure 100.

It can be understood that the number of the second electrode plates 120 may be the same as or different from the number of the first electrode plates 110. The sensing surfaces 103 of the plurality of second electrode plates 120 may be the same or different in area. The area of the sensing surface 103 of the second electrode plate 120 may be the same as or different from the area of the sensing surface 103 of the first electrode plate 110.

In some embodiments, as shown in FIG. 7, the number of the second electrode plates 120 is 16, that is, the number of channels of the touch structure 100 away from the border thereof is 16.

It can be seen from the above that the too large or too small area of the sensing surface 103 of the first electrode plate 110 will affect the accuracy of the touch position detected by the first electrode plate 110. Similarly, the too large or too small area of the sensing surface 103 of the second electrode plate 120 may also affect the accuracy of the touch position detected by the second electrode plate 120. Since the second electrode plate 120 is provided away from the border of the touch structure 100, the accuracy of the touch position detected by a portion of the touch structure 100 away from the border may be affected.

It can be understood that, the principle that the area of the sensing surface 103 of the second electrode plate 120 affects the detection accuracy of the second electrode plate 120 is the same as the principle that the area of the sensing surface 103 of the first electrode plate 110 affects the detection accuracy of the first electrode plate 110, and will not be repeated here.

In order to improve the detection accuracy of the portion of the touch structure 100 away from the border, in some embodiments, the area of the sensing surface 103 of each second electrode plate 120 is in a range of 10 mm² to 40 mm².

It can be understood that the area of the sensing surface 103 of each second electrode plate 120 is set to be in the range of 10 mm² to 40 mm², and thus the area of the sensing surface 103 of the second electrode plate 120 may be prevented from being too large (e.g., greater than 40 mm²), thereby avoiding the excessive capacitance value of the second electrode plate, increasing the influence of the coupling capacitance brought by the touch position on the capacitance value of the second electrode plate 120, reducing the difficulty in positioning the touch position by the second electrode plate 120, and improving the accuracy of the touch position detected by the second electrode plate 120.

Moreover, the area of the sensing surface 103 of the second electrode plate 120 may be prevented from being too small (e.g., less than 10 mm²), thereby avoiding the influence of the touch position on the capacitance values of multiple second electrode plates 120, reducing the difficulty in positioning the touch position by the second electrode plate 120, and improving the accuracy of the touch position detected by the second electrode plate 120.

In addition, preventing the area of the sensing surface 103 of the second electrode plate 120 from being too small may further reduce the number of the second electrode plates 120 on a premise that the area of the touch region 102 remains unchanged, thereby reducing the amount of electrical signals output by the touch structure 100, reducing the difficulty in processing the electrical signals, and further improving the detection accuracy of the touch position. Moreover, reducing the number of the second electrode plates 120 may also simplify the structure, reduce the cost of the touch structure 100, and improve the production efficiency of the touch structure 100.

Since the second electrode plate 120 is provided away from the border of the touch structure 100, the area of the sensing surface 103 of the second electrode plate 120 is prevented from being too large or too small, so that the accuracy of the touch position detected by the second electrode plate 120 may be improved, and thus the accuracy of the touch position detected by the portion of the touch structure 100 away from the border thereof may be improved, thereby further improving the reliability of the touch structure 100.

In some embodiments, the area of the sensing surface 103 of the second electrode plate 120 may be in a range of 14.44 mm² to 37.21 mm², 15 mm² to 35 mm², 18 mm² to 32 mm², 20 mm² to 30 mm², 22 mm² to 28 mm², or 24.5 mm² to 26.5 mm². For example, the area of the sensing surface 103 of the second electrode plate 120 may be 12 mm², 15 mm², 18 mm², 22 mm², 25 mm², 33 mm², 35 mm², or 38 mm².

It can be seen from the above that the area of the sensing surface 103 of the first electrode plate 110 may be the same as or different from the area of the sensing surface 103 of the second electrode plate 120. In some embodiments, a ratio of the area of the sensing surface 103 of the first electrode plate 110 to the area of the sensing surface 103 of the second electrode plate 120 is in a range of 0.6 to 1.5.

It can be understood that the ratio of the area of the sensing surface 103 of the first electrode plate 110 to the area of the sensing surface 103 of the second electrode plate 120 is set to be in the range of 0.6 to 1.5, and thus a difference between the area of the sensing surface 103 of the first electrode plate 110 and the area of the sensing surface 103 of the second electrode plate 120 is prevented from being too large (e.g., the ratio of the areas of the sensing surfaces 103 of the two is greater than 1.5 or less than 0.6), thereby preventing the difference between the electrical signals output by the first electrode plate 110 and the second electrode plate 120 being too large. Therefore, the uniformity between the area of the sensing surface 103 of the first electrode plate 110 and the area of the sensing surface 103 of the second electrode plate 120 may be improved, and thus uniformity and consistency between an electrical signal output by the first electrode plate 110 and an electrical signal output by the second electrode plate 120 may be improved. Moreover, the difficulty in processing the electrical signals may be reduced, the touch consistency of the touch structure 100 may be improved, and thus accuracy and reliability of the touch structure 100 may be improved.

In some embodiments, the ratio of the area of the sensing surface 103 of the first electrode plate 110 to the area of the sensing surface 103 of the second electrode plate 120 may be 0.7, 0.8, 0.9, 1.1, 1.2, 1.3 or 1.4.

In some embodiments, the ratio of the area of the sensing surface 103 of the first electrode plate 110 to the area of the sensing surface 103 of the second electrode plate 120 may be 1, that is, the area of the sensing surface 103 of the first electrode plate 110 is the same or approximately the same as the area of the sensing surface 103 of the second electrode plate 120. Thus, it may further ensure the uniformity and consistency between the electrical signal output by the first electrode plate 110 and the electrical signal output by the second electrode plate 120, and improve the accuracy and reliability of the touch position detected by the touch structure 100.

It can be seen from the above that there may be a plurality of first electrode plates 110 and a plurality of second electrode plates 120. In some embodiments, a ratio of areas of sensing surfaces 103 of any two first electrode plates 110 is in a range of 0.6 to 1.5, and a ratio of areas of sensing surfaces 103 of any two second electrode plates 120 is also in a range of 0.6 to 1.5. In this way, a ratio of areas of sensing surfaces 103 of any two electrode plates 101 is in a range of 0.6 to 1.5. Thus, it may not only improve the uniformity and consistency between the electrical signal output by the first electrode plate 110 and the electrical signal output by the second electrode plate 120, but also improve the uniformity and consistency of the electrical signals output by any two electrode plates 101, thereby further improving the reliability of the touch structure 100.

In some embodiments, the ratio of the areas of the sensing surfaces 103 of any two electrode plates 101 may be 0.7, 0.8, 0.9, 1.1, 1.2, 1.3 or 1.4. It can be understood that the ratio of the areas of the sensing surfaces 103 of any two first electrode plates 110, the ratio of the areas of the sensing surfaces 103 of any two second electrode plates 120, and a ratio of the area of the sensing surface 103 of the first electrode plates 110 to the area of the sensing surface 103 of the second electrode plate 120 may be the same or different.

In some embodiments, a ratio of the area of the sensing surface 103 of the first electrode plate 110 to the area of the sensing surface 103 of the second electrode plate 120 is in a range of 0.8 to 1.2.

It can be seen from the above that the smaller a difference between the area of the sensing surface 103 of the first electrode plate 110 and the area of the sensing surface 103 of the second electrode plate 120, the smaller a difference between the electrical signal output by the first electrode plate 110 and the electrical signal output by the second electrode plate 120, and the greater the accuracy of the touch position detected by the touch structure 100.

Therefore, the ratio of the area of the sensing surface 103 of the first electrode plate 110 to the area of the sensing surface 103 of the second electrode plate 120 is set to be in the range of 0.8 to 1.2, and thus the difference between the area of the sensing surface 103 of the first electrode plate 110 and the area of the sensing surface 103 of the second electrode plate 120 may further be reduced, thereby improving the accuracy and reliability of the touch position detected by the touch structure 100.

In some embodiments, a ratio of the area of the sensing surface 103 of the first electrode plate 110 to the area of the sensing surface 103 of the second electrode plate 120 may be in a range of 0.9 to 1.1. For example, the ratio of the area of the sensing surface 103 of the first electrode plate 110 to the area of the sensing surface 103 of the second electrode plate 120 may be 0.85, 0.95 or 1.05.

In some embodiments, a ratio of areas of sensing surfaces 103 of any two first electrode plates 110 is in a range of 0.8 to 1.2, and a ratio of areas of sensing surfaces 103 of any two second electrode plates 120 is also in a range of 0.8 to 1.2. In this way, a ratio of areas of sensing surfaces 103 of any two electrode plates 101 is in a range of 0.8 to 1.2, and thus the uniformity and consistency of the electrical signals output by any two electrode plates 101 may be improved, thereby further improving the reliability of the touch structure 100.

In some embodiments, a ratio of areas of sensing surfaces 103 of any two electrode plates 101 is in a range of 0.9 to 1.1. For example, the ratio of the areas of the sensing surfaces 103 of any two electrode plates 101 may be 0.85, 0.95 or 1.05.

In some embodiments, a ratio of the area of the sensing surface 103 of the first electrode plate 110 to the area of the sensing surface 103 of the second electrode plate 120 is in a range of 0.95 to 1.05.

It can be understood that the ratio of the area of the sensing surface 103 of the first electrode plate 110 to the area of the sensing surface 103 of the second electrode plate 120 is set to be in the range of 0.95 to 1.05, and thus the difference between the area of the sensing surface 103 of the first electrode plate 110 and the area of the sensing surface 103 of the second electrode plate 120 may further be reduced, thereby improving the accuracy and reliability of the touch structure 100.

In some embodiments, a ratio of the area of the sensing surface 103 of the first electrode plate 110 to the area of the sensing surface 103 of the second electrode plate 120 may be in a range of 0.97 to 1.02 or in a range of 0.98 to 1.01. For example, the ratio of the area of the sensing surface 103 of the first electrode plate 110 to the area of the sensing surface 103 of the second electrode plate 120 is 0.98, 1.02 or 1.03.

In some embodiments, a ratio of areas of sensing surfaces 103 of any two first electrode plates 110 is in a range of 0.95 to 1.05, and a ratio of areas of sensing surfaces 103 of any two second electrode plates 120 is also in a range of 0.95 to 1.05. In this way, a ratio of areas of sensing surfaces 103 of any two electrode plates 101 is in a range of 0.95 to 1.05, and thus the uniformity and consistency of the electrical signals output by any two electrode plates 101 may further be improved, and the accuracy and reliability of the touch structure 100 may be improved.

In some embodiments, a ratio of areas of sensing surfaces 103 of any two electrode plates 101 may be in the range of 0.97 to 1.02 or in the range of 0.98 to 1.01. For example, the ratio of the areas of the sensing surfaces 103 of any two electrode plates 101 is 0.98, 1.02 or 1.03.

In some embodiments, as shown in FIG. 3B, an orthographic projection of each second electrode plate 120 on the virtual reference plane M is in a shape of a polygon.

It can be understood that, the polygon may be a square, a rectangle, a parallelogram, a triangle, a regular hexagon, or the like. It can be seen from the above that, as shown in FIG. 4, adjacent edges of two electrode plates 101 may be curved lines. Therefore, the polygon in the embodiments of the present disclosure may be an approximate polygon surrounded by curved lines.

The orthographic projection of the second electrode plate 120 on the virtual reference plane M is provided as the polygon. In this way, by changing the shape of the second electrode plate 120, the second electrode plates 120 and the first electrode plates 110 may form the touch region 102 with a varying shape, thereby improving the flexibility of the touch structure 100.

Moreover, the orthographic projection of the second electrode plate 120 on the virtual reference plane M is provided as the polygon, and thus the structural regularity of the second electrode plate 120 may further be improved, which facilitates the arrangement of the plurality of second electrode plates 120. Therefore, the production efficiency of the touch structure 100 may be improved.

It can be seen from the above that the electrode plates 101 include a plurality of first electrode plates 110 and a plurality of second electrode plates 120. The following will exemplarily describe the structures of the first electrode plate 110 and the second electrode plate 120 in some embodiments of the present disclosure with reference to FIG. 7.

In some embodiments, as shown in FIG. 7, the plurality of first electrode plates 110 include first irregular electrode plates 111a and second irregular electrode plates 112a. It can be understood that in the embodiments of the present disclosure, the "irregular electrode plate" may be an irregular enclosed structure composed of an arc line segment and straight line segments, or may be an irregular structure composed of a plurality of straight line segments. The term "irregular electrode plate" is only used to distinguish it from electrode plates with other shapes (e.g., square electrode plates and rectangular electrode plates), and embodiments of the present disclosure do not further limit the shape of the "irregular electrode plate".

It can be understood that there may be a plurality of first irregular electrode plates 111a and a plurality of second irregular electrode plates 112a. The shapes of the first irregular electrode plates 111a and the second irregular electrode plates 112a may be the same or different, the numbers of the first irregular electrode plates 111a and the second irregular electrode plates 112a may be the same or different, and areas of sensing surfaces 103 of the first irregular electrode plates 111a and areas of sensing surfaces 103 of the second irregular electrode plates 112a may be the same or different.

For example, as shown in FIG. 7, the first irregular electrode plate 111a includes a first arc edge 1110a, a first edge 1111a and a second edge 1112a. The first arc edge 1110a is a designated edge 1101 of the first irregular electrode plate 111a. In some embodiments, the first arc edge 1110a may be in a shape of a circular arc.

The first edge 1111a of the first irregular electrode plate 111a is connected to an end of the first arc edge 1110a, and the second edge 1112a of the first irregular electrode plate 111a is connected to the other end of the first arc edge 1110a. It can be understood that a length of the first edge 1111a of the first irregular electrode plate 111a may be the same as or different from a length of the second edge 1112a of the first irregular electrode plate 111a.

An end of the first edge 1111a of the first irregular electrode plate 111a away from the first arc edge 1110a is connected to an end of the second edge 1112a of the first irregular electrode plate 111a away from the first arc edge 1110a. Moreover, the first edge 1111a of the first irregular electrode plate 111a is perpendicular to the second edge 1112a of the first irregular electrode plate 111a, so that the first arc edge 1110a, the first edge 1111a of the first irregular electrode plate 111a and the second edge 1112a of the first irregular electrode plate 111a may form a closed first irregular electrode plate 111a.

As shown in FIG. 7, the second irregular electrode plate 112a is provided adjacent to the first edge 1111a of the first irregular electrode plate 111a. In this way, by adjusting shapes or areas of the first irregular electrode plate 111a, the second irregular electrode plate 112a and the second electrode plate 120, the touch region 102 with a varying shape may be formed, thereby improving the flexibility of the touch structure 100.

In some embodiments, as shown in FIG. 7, each second electrode plate 120 is in a shape of a square. First irregular electrode plates 111a, second irregular electrode plates 112a and square second electrode plates 120 may form a circular touch region 102. It can be understood that, by adjusting lengths of different edges of the first irregular electrode plates 111a, the second irregular electrode plates 112a, and the second electrode plates 120, a diameter of the circular touch region 102 may be adjusted to improve the flexibility of the touch structure 100.

For example, as shown in FIG. 7, the plurality of second electrode plates 120 include first square electrode plates 121 and second square electrode plates 122. In some embodiments, a length of an edge of the first square electrode plate 121 is the same as a length of an edge of the second square electrode plate 122, that is, an area of a sensing surface 103 of the first square electrode plate 121 is the same or approximately the same as an area of a sensing surface 103 of the second square electrode plate 122.

The first square electrode plate 121 is provided adjacent to the second edge 1112a of the first irregular electrode plate 111a, and the second square electrode plate 122 is adjacent to both the first square electrode plate 121 and the second irregular electrode plate 112a.

In some embodiments, the length of the edge of the first square electrode plate 121 is the same as the length of the second edge 1112a of the first irregular electrode plate 111a, and the length of the edge of the second square electrode plate 122 is the same as a length of an edge of the second irregular electrode plate 112a proximate to the second square electrode plate 122, which may improve the regularity of the touch structure 100.

In some examples, as shown in FIG. 7, the plurality of second electrode plates 120 further include fourth square electrode plates 127. The fourth square electrode plate 127 is provided adjacent to the second square electrode plate 122, and the fourth square electrode plate 127 is provided away from all irregular electrode plates (including the first irregular electrode plates 111a and the second irregular electrode plates 112a).

For example, lengths of edges of the first square electrode plates 121, the second square electrode plates 122 and the fourth square electrode plates 127 are the same, which may further improve the regularity of the touch structure 100.

In some embodiments, as shown in FIG. 7, there is a first gap L1 between the second irregular electrode plate 112a and the first edge 1111a of the first irregular electrode plate 111a, there is a second gap L2 between the second square electrode plate 122 and the first square electrode plate 121, and the second gap L2 and the first gap L1 are located on a same straight line.

Such provision improves the regularity of the arrangement of the first irregular electrode plates 111a, the second irregular electrode plates 112a, the first square electrode plates 121 and the second square electrode plates 122, that is, the regularity of the arrangement between the first electrode plates 110 and the second electrode plates 120 may be improved. Thus, the convenience of processing the touch structure 100 may be improved, and the production cost of the touch structure 100 may be reduced.

In some embodiments, as shown in FIG. 7, there is a third gap L3 between two adjacent second irregular electrode plates 112*a*, there is a fourth gap L4 between two adjacent second square electrode plates 122, and the third gap L3 and the fourth gap L4 are located on a same straight line, which may further improve the regularity of the arrangement between the first electrode plates 110 and the second electrode plates 120.

In some embodiments, as shown in FIG. 7, there is a seventeenth gap L17 between two adjacent fourth square electrode plates 127. The seventeenth gap L17 is located on a same straight line as the third gap L3 and the fourth gap L4, which may further improve the regularity of the arrangement between the plurality of electrode plates 101.

It can be seen from the above that the areas of the sensing surfaces 103 of the first irregular electrode plates 111*a* and the areas of the sensing surfaces 103 of the second irregular electrode plates 112*a* may be the same or different. In some embodiments, the area of the sensing surface 103 of the first irregular electrode plate 111*a* is smaller than the area of the sensing surface 103 of the second irregular electrode plate 112*a*.

It can be understood that setting the area of the sensing surface 103 of the first irregular electrode plate 111*a* to be smaller than the area of the sensing surface 103 of the second irregular electrode plate 112*a* may further reduce the area of the sensing surface 103 of the first irregular electrode plate 111*a*, thereby improving the accuracy of the touch position detected by the first irregular electrode plate 111*a*.

Moreover, setting the area of the sensing surface 103 of the first irregular electrode plate 111*a* to be smaller than the area of the sensing surface 103 of the second irregular electrode plate 112*a* may, on a basis of the first gap L1 and the second gap L2 being located on the same straight line, cause the designated edge 1101 of the first irregular electrode plate 111*a* and the designated edge 1101 of the second irregular electrode plate 112*a* to surround to form an arc shape, thereby improving the regularity of the touch structure 100.

In some embodiments, the sensing surfaces 103 of the plurality of second electrode plates 120 have the same areas. A ratio of the area of the sensing surface 103 of the first irregular electrode plate 111*a* to the area of the sensing surface 103 of any second electrode plate 120 is 0.6. A ratio of the area of the sensing surface 103 of the second irregular electrode plate 112*a* to the area of the sensing surface 103 of any second electrode plate 120 is 0.9.

In this way, on a basis that the area of the sensing surface 103 of the first irregular electrode plate 111*a* is smaller than the area of the sensing surface 103 of the second irregular electrode plate 112*a*, a ratio of the areas of the sensing surfaces 103 of any two electrode plates 101 may be in a range of 0.6 and 1.5, thereby avoiding an excessive difference between the areas of the sensing surfaces 103 of any two electrode plates 101, ensuring an improvement of the uniformity of the electrical signals output by the touch structure 100, and improving the accuracy and reliability of the touch structure 100.

In some embodiments, a length an edge of each second electrode plate 120 is in a range of 3.17 mm to 6.32 mm.

It can be seen from the above that the area of the sensing surface 103 of the second electrode plate 120 is in the range of 10 mm$^2$ to 40 mm$^2$, and the second electrode plate 120 is in a shape of a square. Therefore, setting the length of the edge of each second electrode plate 120 to be in the range of 3.17 mm to 6.32 mm may, on a basis of improving the regularity of the structure of the second electrode plate 120, make the area of the sensing surface 103 of the second electrode plate 120 meet the requirements, which may prevent the area of the sensing surface 103 of the second electrode plate 120 from being too large or too small, thereby ensuring the accuracy of the touch position detected by the touch structure 100.

In some embodiments, the length of the edge of the second electrode plate 120 may be in a range of 3.8 mm to 6.1 mm, that is, the area of the sensing surface 103 of the second electrode plate 120 is in a range of 14.44 mm$^2$ to 37.21 mm$^2$. In some embodiments, the length of the edge of the second electrode plate 120 may also be in a range of 4 mm to 6 mm, 4.2 mm to 5.8 mm, 4.5 mm to 5.5 mm, or 4.7 mm to 5.3 mm. For example, the length of the edge of the second electrode plate 120 may be 3.3 mm, 3.5 mm, 3.9 mm, 4.5 mm, 4.8 mm, 5 mm, 5.3 mm, 5.8 mm or 6.2 mm.

Figure 9:
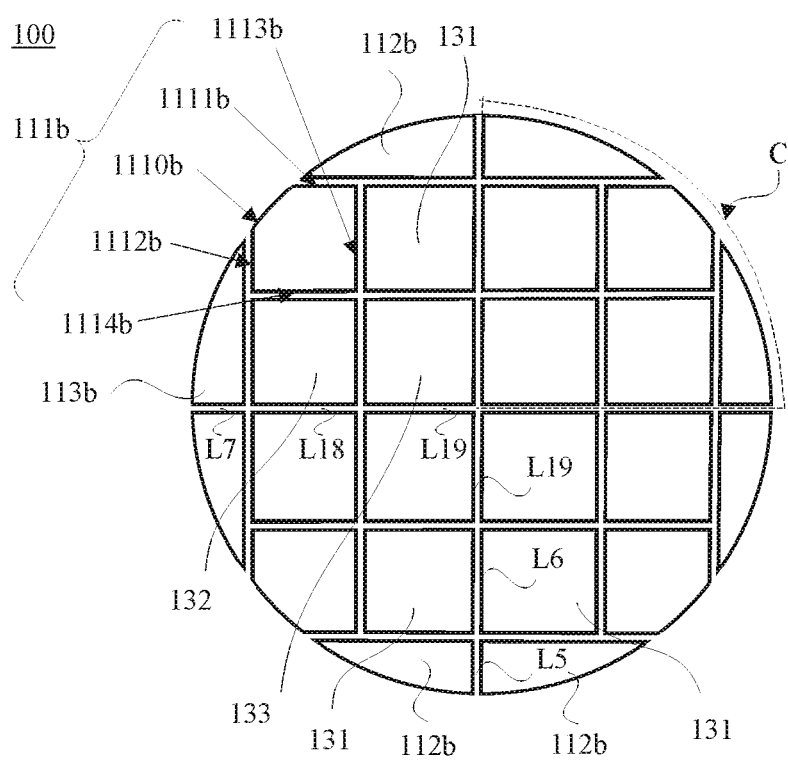
FIG. 9 is a structural diagram of yet another touch structure, in accordance with some embodiments.

FIG. 9 is a structural diagram of yet another touch structure 100 in accordance with some embodiments. It can be seen from the above that, in some embodiments, the plurality of first electrode plates 110 include the first irregular electrode plates 111*a* and the second irregular electrode plates 112*a*. In some other embodiments, as shown in FIG. 9, the plurality of first electrode plates 110 include third irregular electrode plates 111*b*, fourth irregular electrode plates 112*b* and fifth irregular electrode plates 113*b*.

It can be understood that there may be a plurality of third irregular electrode plates 111*b*, a plurality of fourth irregular electrode plates 112*b* and a plurality of fifth irregular electrode plates 113*b*. The shapes of the third irregular electrode plates 111*b*, the fourth irregular electrode plates 112*b* and the fifth irregular electrode plates 113*b* may be the same or different. The numbers of the third irregular electrode plates 111*b*, the fourth irregular electrode plates 112*b* and the fifth irregular electrode plates 113*b* may be the same or different. The areas of the sensing surfaces 103 of the third irregular electrode plates 111*b*, the sensing surfaces 103 of the fourth irregular electrode plates 112*b* and the sensing surfaces 103 of the fifth irregular electrode plates 113*b* may be the same or different.

For example, as shown in FIG. 9, the third irregular electrode plate 111*b* includes a second arc edge 1110*b*, a first edge 1111*b* and a second edge 1112*b*. The second arc edge 1110*b* is the designated edge 1101 of the third irregular electrode plate 111*b*. In some embodiments, the second arc edge 1110*b* may be in a shape of a circular arc.

The first edge 1111*b* of the third irregular electrode plate 111*b* is connected to an end of the second arc edge 1110*b*, and the second edge 1112*b* of the third irregular electrode plate 111*b* is connected to the other end of the second arc edge 1110*b*. A direction in which the first edge 1111*b* of the third irregular electrode plate 111*b* extends is perpendicular to a direction in which the second edge 1112*b* of the third irregular electrode plate 111*b* extends.

In some embodiments, as shown in FIG. 9, the third irregular electrode plate 111*b* may further include a third edge 1113*b* and a fourth edge 1114*b*. The third edge 1113*b* of the third irregular electrode plate 111*b* is connected to an end of the first edge 1111*b* of the third irregular electrode plate 111*b* away from the second arc edge 1110*b*. The fourth edge 1114*b* of the third irregular electrode plate 111*b* is connected to an end of the second edge 1112*b* of the third irregular electrode plate 111*b* away from the second arc edge 1110*b*. An end of the third edge 1113*b* of the third irregular electrode plate 111*b* away from the first edge 1111*b* of the third irregular electrode plate 111*b* is connected to an end of the fourth edge 1114*b* of the third irregular electrode plate 111*b* away from the second edge 1112*b* of the third irregular electrode plate 111*b*, and the third edge 1113*b* of the third irregular electrode plate 111*b* is perpendicular to the fourth edge 1114*b* of the third irregular electrode plate 111*b*.

In this way, the second arc edge 1110*b*, the first edge 1111*b* of the third irregular electrode plate 111*b*, the second edge 1112*b* of the third irregular electrode plate 111*b*, the third edge 1113*b* of the third irregular electrode plate 111*b* and the fourth edge 1114*b* of the third irregular electrode plate 111*b* may form a closed third irregular electrode plate 111*b*.

As shown in FIG. 9, the fourth irregular electrode plate 112*b* is provided adjacent to the first edge 1111*b* of the third irregular electrode plate 111*b*, and the fifth irregular electrode plate 113*b* is provided adjacent to the second edge 1112*b* of the third irregular electrode plate 111*b*. In this way, by adjusting shapes or areas of the third irregular electrode plate 111*b*, the fourth irregular electrode plate 112*b*, the fifth irregular electrode plate 113*b* and the second electrode plate 120, the touch region 102 with a varying shape may be formed, thereby improving the flexibility of the touch structure 100.

In some embodiments, as shown in FIG. 9, each second electrode plate 120 is in a shape of a square. Third irregular electrode plates 111*b*, fourth irregular electrode plates 112*b*, fifth irregular electrode plates 113*b* and square second electrode plates 120 may form a circular touch region 102. It can be understood that, by adjusting lengths of different edges of the irregular electrode plates 111*b*, fourth irregular electrode plates 112*b*, fifth irregular electrode plates 113*b* and square second electrode plates 120, a diameter of the circular touch region 102 may be adjusted to improve the flexibility of the touch structure 100.

In some embodiments, as shown in FIG. 9, the plurality of second electrode plates 120 includes fifth square electrode plates 131, sixth square electrode plates 132 and seventh square electrode plates 133. For example, the fifth square electrode plate 131 is provided adjacent to the third edge 1113*b* of the third irregular electrode plate 111*b* and the fourth irregular electrode plate 112*b*, the sixth square electrode plate 132 is provided adjacent to the fourth edge 1114*b* of the third irregular electrode plate 111*b* and the fifth irregular electrode plate 113*b*, the seventh square electrode plate 133 is provided adjacent to the fifth square electrode plate 131 and the sixth square electrode plate 132, and the seventh square electrode plate 133 is provided away from all irregular electrode plates (including the third irregular electrode plate 111*b*, the fourth irregular electrode plate 112*b* and the fifth irregular electrode plate 113*b*).

Moreover, lengths of edges of the fifth square electrode plates 131, the sixth square electrode plates 132 and the seventh square electrode plates 133 are the same. The length of the third edge 1113*b* of the third irregular electrode plate 111*b*, the length of the fourth edge 1114*b* of the third irregular electrode plate 111*b* and the length of the edge of any second electrode plate 120 (including the fifth square electrode plate 131, the sixth square electrode plate 132 and the seventh square electrode plate 133) are the same, which may further improve the regularity of the structure of the touch structure 100.

In some embodiments, as shown in FIG. 9, there is a fifth gap L5 between two adjacent fourth irregular electrode plates 112*b*, and there is a sixth gap L6 between two adjacent fifth square electrode plates 131. The fifth gap L5 and the sixth gap L6 are located on a same straight line, which may further improve the regularity of the arrangement between the first electrode plates 110 and the second electrode plates 120.

As shown in FIG. 9, there is a seventh gap L7 between two adjacent fifth irregular electrode plates 113*b*, and there is an eighteenth gap L18 between two adjacent sixth square electrode plates 132. The seventh gap L7 and the eighteenth gap L18 are located on a same straight line.

As shown in FIG. 9, there is a nineteenth gap L19 between two adjacent seventh square electrode plates 133. For example, there are two nineteenth gaps L19 adjacent to each seventh square electrode plate 133, and the two nineteenth gaps L19 are perpendicular to each other. A nineteenth gap L19 is located on a same straight line as the fifth gap L5 and the sixth gap L6, and another nineteenth gap L19 is located on a same straight line as the seventh gap L7 and the eighteenth gap L18. Therefore, the regularity of the arrangement of the first electrode plates 110 and the second electrode plates 120 may further be improved.

In some embodiments, a length an edge of each second electrode plate 120 is in a range of 5 mm to 6 mm.

It can be seen from the above that the area of the sensing surface 103 of the second electrode plate 120 is in the range of 10 mm$^2$ to 40 mm$^2$, and the second electrode plate 120 is in a shape of a square. Therefore, setting the length of the edge of each second electrode plate 120 to be in the range of 5 mm to 6 mm may, on a basis of improving the regularity of the structure of the second electrode plate 120, make the area of the sensing surface 103 of the second electrode plate 120 meet the requirements, which may prevent the area of the sensing surface 103 of the second electrode plate 120 from being too large or too small, thereby ensuring the reliability of the touch structure 100.

In addition, setting the length of the edge of the second electrode plate 120 to be in the range of 5 mm to 6 mm may increase a sum of areas of sensing surfaces 103 of all the second electrode plates 120, so that a sum of areas of sensing surfaces 103 of the first electrode plates 110 may be reduced on a premise that the area of the touch region 102 remains unchanged. It can be understood that reducing the sum of the areas of the sensing surfaces 103 of the first electrode plates 110 may reduce the number of the first electrode plates 110, and further reduce the amount of electrical signals output by the touch structure 100, thereby reducing the difficulty in processing the electrical signals and improving the accuracy of the detected touch position.

In some embodiments, the length of the edge of the second electrode plate 120 may be in a range of 5.1 mm to 5.9 mm, 5.2 mm to 5.8 mm, 5.3 mm to 5.7 mm, or 5.4 mm to 5.6 mm. For example, the length of the edge of the second electrode plate 120 may be 5.15 mm, 5.25 mm, 5.55 mm, 5.65 mm, 5.75 mm or 5.85 mm.

In some embodiments, as shown in FIG. 9, the number of the first electrode plates 110 is 12, and the number of the second electrode plates 120 is also 12, that is, the number of the channels of the touch structure 100 is 24.

Figure 10:
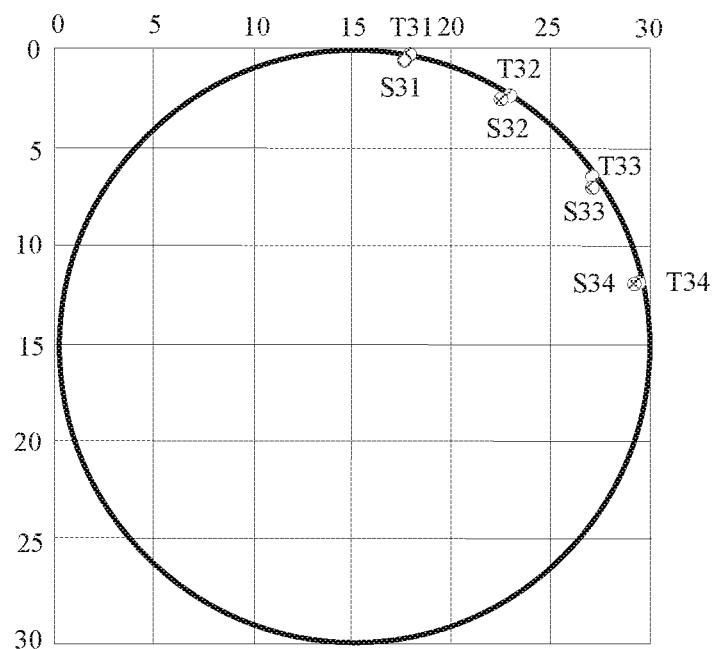
FIG. 10 is a diagram showing a simulation result of region C in FIG. 9.

FIG. 10 is a diagram showing a simulation result of region C in FIG. 9. The simulation results of the touch structure 100 in some embodiments of the present disclosure will be exemplarily illustrated below with reference to FIGS. 9 and 10. For example, as shown in FIG. 9, simulation is performed on the region C of the touch structure 100, and the simulation result is shown in FIG. 10. In FIG. 10, points T are actual touch points, and points S are simulation points obtained by simulation. By considering four actual touch points of T31 to T34 as an example, a straight-line distance between the actual touch point T31 and the simulation point S31 is 0.29 mm, a straight-line distance between the actual touch point T32 and the simulation point S32 is 0.45 mm, a straight-line distance between the actual touch point T33 and the simulation point S33 is 0.53 mm, and a straight-line distance between the actual touch point T34 and the simulation point S34 is 0.29 mm. It can be seen that the above arrangement may cause a maximum error value between the actual touch point T and the simulated point S is only 0.53 mm, which may improve the accuracy of the touch structure 100.

Figure 11:
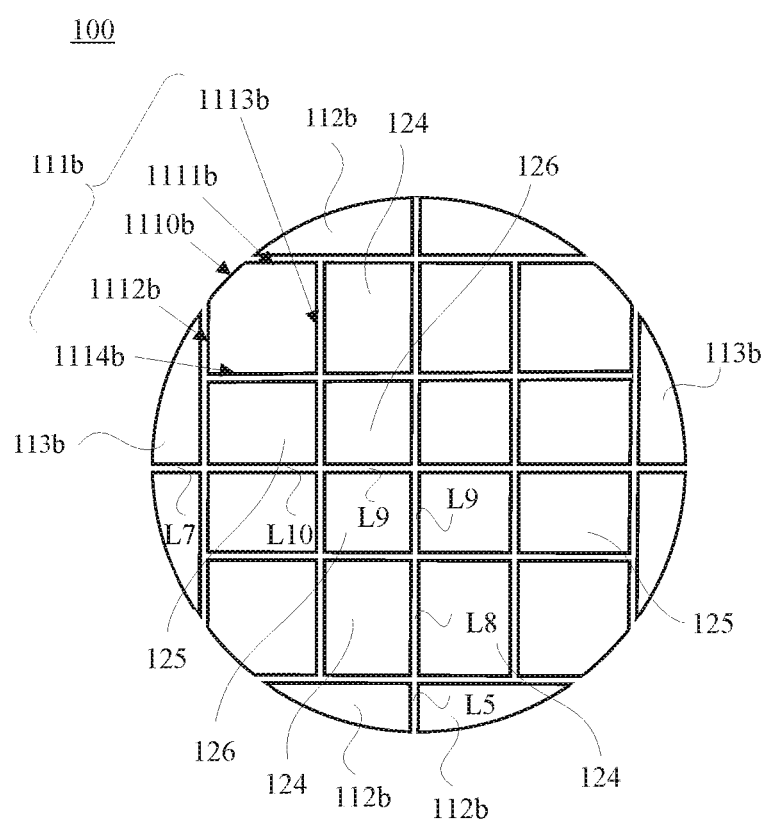
FIG. 11 is a structural diagram of yet another touch structure, in accordance with some embodiments.

FIG. 11 is a structural diagram of yet another touch structure 100 in accordance with some embodiments. It can be seen from the above that, in some embodiments, the plurality of second electrode plates 120 are each in a shape of a square. In some other embodiments, as shown in FIG. 11, the plurality of second electrode plates 120 include first rectangular electrode plates 124, second rectangular electrode plates 125 and third square electrode plates 126. It can be understood that shapes of the first rectangular electrode plates 124 and the second rectangular electrode plates 125 may be squares or oblongs.

It will be understood that the numbers of the first rectangular electrode plates 124, the second rectangular electrode plates 125 and the third square electrode plates 126 may be the same or different. Areas of sensing surfaces 103 of the first rectangular electrode plates 124, area of sensing surfaces 103 of the second rectangular electrode plates 125 and area of sensing surfaces 103 of the third square electrode plates 126 may be the same or different.

As shown in FIG. 11, the first rectangular electrode plate 124 is provided adjacent to the third edge 1113b of the third irregular electrode plate 111b, the second rectangular electrode plate 125 is provided adjacent to the fourth edge 1114b of the third irregular electrode plate 111b, and the third square electrode plate 126 is provided adjacent to the first rectangular electrode plate 124 and the second rectangular electrode plate 125. Moreover, the third square electrode plate 126 is provided away from the irregular electrode plates (including the third irregular electrode plate 111b, the fourth irregular electrode plate 112b and the fifth irregular electrode plate 113b).

It can be understood that by adjusting shapes or areas of the first rectangular electrode plate 124, the second rectangular electrode plate 125 and the third square electrode plate 126, the touch region 102 with a varying shape may be formed, thereby improving the flexibility of the touch structure 100.

In some embodiments, as shown in FIG. 11, the first rectangular electrode plates 124 and the second rectangular electrode plates 125 may surround the third square electrode plates 126.

In some embodiments, the first rectangular electrode plates 124, the second rectangular electrode plates 125, the third square electrode plates 126 and the plurality of first electrode plates 110 (the third irregular electrode plates 111b, the fourth irregular electrode plates 112b and the fifth irregular electrode plates 113b) may form the circular touch region 102. It can be understood that, by adjusting lengths of different edges of the first rectangular electrode plates 124, the second rectangular electrode plates 125, the third square electrode plates 126, and the first electrode plates 110, a diameter of the circular touch region 102 may be adjusted to improve the flexibility of the touch structure 100.

It can be seen from the above that, as shown in FIG. 11, there is a fifth gap L5 between two adjacent fourth irregular electrode plates 112b. In some embodiments, there is an eighth gap L8 between two adjacent first rectangular electrode plates 124, and the fifth gap L5 and the eighth gap L8 are located on a same straight line.

It can be seen from the above that there is a seventh gap L7 between two adjacent fifth irregular electrode plates 113b. In some embodiments, there is a tenth gap L10 between two adjacent second rectangular electrode plates 125, and the seventh gap L7 and the tenth gap L10 are located on a same straight line, which may further improve the regularity of the touch structure 100.

In some embodiments, there is a ninth gap L9 between two adjacent third square electrode plates 126. For example, there are two ninth gaps L9 adjacent to each third square electrode plates 126, and the two ninth gaps L9 are perpendicular to each other. A ninth gap L9 is located on a same straight line as the fifth gap L5 and the eighth gap L8, and another ninth gap L9 is located on a same straight line as the tenth gap L10 and the seventh gap L7.

In some embodiments, the area of the sensing surface 103 of the first rectangular electrode plate 124, the area of the sensing surface 103 of the second rectangular electrode plate 125, and the area of the sensing surface 103 of the third irregular electrode plate 111b are the same. In this way, the first rectangular electrode plate 124 being provided adjacent to the third edge 1113b of the third irregular electrode plate 111b and the second rectangular electrode plate 125 being provided adjacent to the fourth edge 1114b of the third irregular electrode plate 111b mean that electrode plates 101 with the same areas of the sensing surfaces 103 may be arranged adjacent to each other, which may further improve the regularity of the arrangement of the touch structure 100.

In some embodiments, as shown in FIG. 11, the length of the third edge 1113b of the third irregular electrode plate 111b is the same as a length of an edge of the first rectangular electrode plate 124 proximate to the third irregular electrode plate 111b, and the length of the fourth edge 1114b of the third irregular electrode plate 111b is the same as a length of an edge of the second rectangular electrode plate 125 proximate to the third irregular electrode plate 111b.

In this way, the regularity of the arrangement of the third irregular electrode plate 111b, the first rectangular electrode plate 124 and the second rectangular electrode plate 125 may further be improved, thereby improving the processing convenience of the touch structure 100.

In some examples, a length of an edge of the third square electrode plate 126, a length of an edge of the first rectangular electrode plate 124 proximate to the third square electrode plate 126, and a length of an edge of the second rectangular electrode plate 125 proximate to the third square electrode plate 126 are the same.

In some embodiments, the area of the sensing surface 103 of the third square electrode plate 126 is smaller than the area of the sensing surface 103 of the first rectangular electrode plate 124. Moreover, the area of the sensing surface 103 of the third square electrode plate 126 is also smaller than the area of the sensing surface 103 of the second rectangular electrode plate 125.

It can be understood that, the area of the sensing surface 103 of the third square electrode plate 126 being set to be smaller than both the area of the sensing surface 103 of the first rectangular electrode plate 124 and the area of the sensing surface 103 of the second rectangular electrode plate 125 may further reduce the area of the sensing surface 103 of the third square electrode plate 126, thereby improving the accuracy of the touch position detected by the third square electrode plate 126.

Moreover, the area of the sensing surface 103 of the third square electrode plate 126 being set to be smaller than both the area of the sensing surface 103 of the first rectangular electrode plate 124 and the area of the sensing surface 103 of the second rectangular electrode plate 125 may further make the areas of the sensing surfaces 103 of the plurality of second electrode plates 120 different, which may improve the flexibility of the touch structure 100.

In some embodiments, the sensing surfaces 103 of the third square electrode plates 126 have the same areas. A ratio of an area of a sensing surface 103 of any of the first rectangular electrode plate 124, the second rectangular electrode plate 125 and the third irregular electrode plate 111b to the area of the sensing surface 103 of the third square electrode plate 126 is 1.2. Such setting causes the ratio of the areas of the sensing surfaces 103 of any two electrode plates 101 to be in the range of 0.6 to 1.5, which may further improve the uniformity of the electric signals output by the touch structure 100.

In some embodiments, sensing surfaces 103 of at least part of the first electrode plates 110 have the same areas as sensing surfaces 103 of at least part of the second electrode plates 120.

It can be seen from the above that, as shown in FIG. 9, in some embodiments, the first electrode plate 110 may include third irregular electrode plates 111b, fourth irregular electrode plates 112b and fifth irregular electrode plates 113b, and the second electrode plates 120 are each in a shape of a square. In this way, the sensing surfaces 103 of at least part of the first electrode plates 110 have the same areas as the sensing surfaces 103 of at least part of the second electrode plates 120, which may be that an area of a sensing surface 103 of any of the third irregular electrode plate 111b, the fourth irregular electrode plate 112b and the fifth irregular electrode plate 113b is the same as the area of the sensing surface 103 of the second electrode plate 120 (including the fifth square electrode plate 131, the sixth square electrode plate 132 and the seventh square electrode plate 133), which may further improve the accuracy and reliability of the touch structure 100.

In some embodiments, as shown in FIG. 9, the area of the sensing surface 103 of the fourth irregular electrode plate 112b, the area of the sensing surface 103 of the fifth irregular electrode plate 113b and the area of the sensing surface 103 of the second electrode plate 120 are the same or approximately the same. The area of the sensing surface 103 of the third irregular electrode plate 111b is smaller than the areas of the above three.

In some embodiments, a ratio of the area of the sensing surface 103 of the third irregular electrode plate 111b to any of the area of the sensing surface 103 of the fourth irregular electrode plate 112b, the area of the sensing surface 103 of the fifth irregular electrode plate 113b, and the area of the sensing surface 103 of the second electrode plates 120 is 0.9.

In some other embodiments, as shown in FIG. 11, the second electrode plates 120 may include first rectangular electrode plates 124, second rectangular electrode plates 125 and third square electrode plates 126. In this way, the sensing surfaces 103 of at least part of the first electrode plates 110 have the same areas as the sensing surfaces 103 of at least part of the second electrode plates 120, which may be that an area of a sensing surface 103 of any of the third irregular electrode plate 111b, the fourth irregular electrode plate 112b and the fifth irregular electrode plate 113b is the same as an area of a sensing surface 103 of any of the first rectangular electrode plate 124, the second rectangular electrode plate 125 and the third square electrode plate 126.

In some embodiments, the area of the sensing surface 103 of the third irregular electrode plate 111b, the area of the sensing surface 103 of the fourth irregular electrode plate 112b, the area of the sensing surface 103 of the fifth irregular electrode plate 113b, the area of the sensing surface 103 of the first rectangular electrode plate 124 and the area of the sensing surface 103 of the second rectangular electrode plate 125 are the same or approximately the same. The area of the sensing surface 103 of the third square electrode plate 126 is smaller than the area of the sensing surface 103 of any of the above.

In some embodiments, a ratio of an area of a sensing surface 103 of any of the third irregular electrode plate 111b, the fourth irregular electrode plate 112b, the fifth irregular electrode plate 113b, the first rectangular electrode plate 124 and the second rectangular electrode plate 125 to the area of the sensing surface 103 of the third square electrode plate 126 is 1.2.

Figure 12:
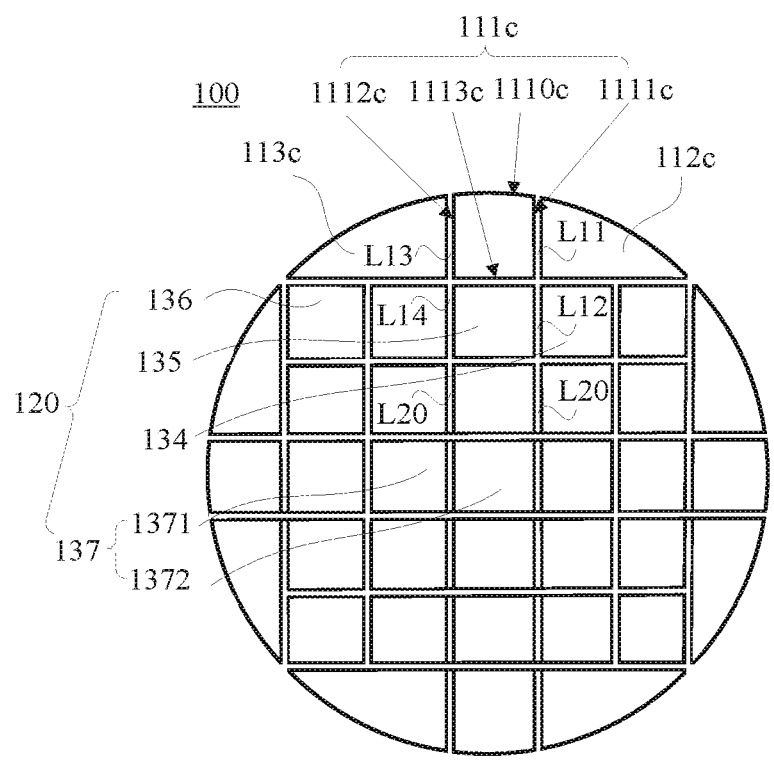
FIG. 12 is a structural diagram of yet another touch structure, in accordance with some embodiments.

FIG. 12 is a structural diagram of yet another touch structure 100 in accordance with some embodiments.

In yet other embodiments, as shown in FIG. 12, the plurality of first electrode plates 110 include sixth irregular electrode plates 111c, seventh irregular electrode plates 112c and eighth irregular electrode plates 113c.

It can be understood that there may be a plurality of sixth irregular electrode plates 111c, a plurality of seventh irregular electrode plates 112c and a plurality of eighth irregular electrode plates 113c. The shapes of the sixth irregular electrode plates 111c, the seventh irregular electrode plates 112c and the eighth irregular electrode plates 113c may be the same or different. The numbers of the sixth irregular electrode plates 111c, the seventh irregular electrode plates 112c and the eighth irregular electrode plates 113c may be the same or different. Areas of sensing surfaces 103 of the sixth irregular electrode plates 111c, sensing surfaces 103 of the seventh irregular electrode plates 112c and sensing surfaces 103 of the eighth irregular electrode plates 113c may be the same or different.

For example, as shown in FIG. 12, the sixth irregular electrode plate 111c includes a third arc edge 1110c, a first edge 1111c and a second edge 1112c. The third arc edge 1110c is the designated edge 1101 of the sixth irregular electrode plate 111c. In some embodiments, the third arc edge 1110c may be a circular arc.

The first edge 1111c of the sixth irregular electrode plate 111c is connected to an end of the third arc edge 1110c, the second edge 1112c of the sixth irregular electrode plate 111c is connected to the other end of the third arc edge 1110c, and the first edge 1111c of the sixth irregular electrode plate 111c is parallel to the second edge 1112c of the sixth irregular electrode plate 111c.

It can be understood that as shown in FIG. 12, the sixth irregular electrode plate 111c further includes a third edge 1113c. An end of the first edge 1111c of the sixth irregular electrode plate 111c away from the third arc edge 1110c is connected to an end of the third edge 1113c of the sixth irregular electrode plate 111c, and an end of the second edge 1112c of the sixth irregular electrode plate 111c away from the third arc edge 1110c is connected to the other end of the third edge 1113c of the sixth irregular electrode plate 111c.

In this way, the third arc edge 1110c, the first edge 1111c of the sixth irregular electrode plate 111c, the second edge 1112c of the sixth irregular electrode plate 111c, and the third edge 1113c of the sixth irregular electrode plate 111c may form a closed sixth irregular electrode plate 111c.

As shown in FIG. 12, the seventh irregular electrode plate 112c is provided adjacent to the first edge 1111c of the sixth irregular electrode plate 111c, and the eighth irregular electrode plate 113c is provided adjacent to the second edge 1112c of the sixth irregular electrode plate 111c. In this way, by adjusting shapes or areas of the sixth irregular electrode plate 111c, the seventh irregular electrode plate 112c, the eighth irregular electrode plate 113c and the second electrode plate 120, the touch region 102 with a varying shape may be formed, thereby improving the flexibility of the touch structure 100.

In some embodiments, as shown in FIG. 12, each second electrode plate 120 is in a shape of a square. The plurality of sixth irregular electrode plates 111c, the plurality of seventh irregular electrode plates 112c, the plurality of eighth irregular electrode plates 113c and the plurality of square second electrode plates 120 may form a circular touch region 102. It can be understood that, by adjusting lengths of different edges of the sixth irregular electrode plates 111c, the seventh irregular electrode plates 112c, the eighth irregular electrode plates 113c and the second electrode plates 120, a diameter of the circular touch region 102 may be adjusted to improve the flexibility of the touch structure 100.

For example, as shown in FIG. 12, the plurality of second electrode plates 120 include eighth square electrode plates 134, ninth square electrode plates 135, tenth square electrode plates 136 and eleventh square electrode plates 137. The eighth square electrode plates 134 are provided adjacent to the seventh irregular electrode plate 112c, the ninth square electrode plate 135 is provided adjacent to the sixth irregular electrode plate 111c, and the tenth square electrode plates 136 are provided adjacent to the eighth irregular electrode plate 113c.

For example, there may be a plurality of eleventh square electrode plates 137, and the plurality of eleventh square electrode plates 137 are arranged in an array. In some examples, the eleventh square electrode plates 137 include first sub-electrode plates 1371 and a second sub-electrode plate 1372.

The first sub-electrode plates 1371 are provided adjacent to the eighth square electrode plate 134, the ninth square electrode plate 135 and the tenth square electrode plate 136, and the first sub-electrode plates 1371 are provided away from each irregular electrode plate (including the sixth irregular electrode plate 111c, the seventh irregular electrode plate 112c and the eighth irregular electrode plate 113c).

The second sub-electrode plate 1372 is provided adjacent to the first sub-electrode plates 1371 and away from the eighth square electrode plates 134, the ninth square electrode plates 135 and the tenth square electrode plates 136. For example, the first sub-electrode plates 1371 surround the second sub-electrode plate 1372.

In some embodiments, edges of the eighth square electrode plate 134, the ninth square electrode plate 135, the tenth square electrode plate 136 and the eleventh square electrode plate 137 (including the first sub-electrode plate 1371 and the second sub-electrode plate 1372) have the same lengths.

A length of the third edge 1113c of the sixth irregular electrode plate 111c is the same as the length of the edge of the ninth square electrode plate 135. A length of an edge of the seventh irregular electrode plate 112c proximate to the eighth square electrode plates 134 is twice the length of the edge of the eighth square electrode plate 134. A length of an edge of the eighth irregular electrode plate 113c proximate to the tenth square electrode plates 136 is twice the length of the edge of the tenth square electrode plate 136.

In some embodiments, as shown in FIG. 12, there is an eleventh gap L11 between the seventh irregular electrode plate 112c and the first edge 1111c of the sixth irregular electrode plate 111c, and there is a twelfth gap L12 between the eighth square electrode plate 134 and the ninth square electrode plate 135. The eleventh gap L11 and the twelfth gap L12 are located on a same straight line.

There is a thirteenth gap L13 between the eighth irregular electrode plate 113c and the second edge 1112c of the sixth irregular electrode plate 111c, and there is a fourteenth gap L14 between the ninth square electrode plate 135 and the tenth square electrode plate 136. The thirteenth gap L13 and the fourteenth gap L14 are located on a same straight line, which may further improve the regularity of the structure of the touch structure 100.

In some embodiments, as shown in FIG. 12, there is a twentieth gap L20 between two adjacent eleventh square electrode plates 137. For example, there are a plurality of twentieth gaps L20, and at least two twentieth gaps L20 are parallel to each other. A twentieth gap L20 is located on a same straight line as the eleventh gap L11 and the twelfth gap L12, and another twentieth gap L20 is located on a same straight line as the thirteenth gap L13 and the fourteenth gap L14.

It can be seen from the above that the area of the second electrode plate 120 is in the range of 10 mm$^2$ to 40 mm$^2$, and the second electrode plate 120 is in the shape of the square. In some embodiments, a length of an edge of each second electrode plate 120 is in a range of 4 mm to 4.2 mm.

The length of the edge of each second electrode plate 120 is set to be in the range of 4 mm to 4.2 mm, so that the area of the sensing surface 103 of the second electrode plate 120 may satisfy the requirements on a basis of improving the regularity of the structure of the second electrode plate 120, so as to prevent the area of the sensing surface 103 of the second electrode plate 120 from being too large or too small, thereby ensuring the reliability of the touch structure 100.

Moreover, the length of the edge of each second electrode plate 120 is set to be in the range of 4 mm to 4.2 mm, so that the number of the second electrode plates 120 may increase on a premise that the area of the touch region 102 remains unchanged, thereby improving the accuracy of the touch position detected by the second electrode plates 120, that is, improving the accuracy and reliability of the touch structure 100.

For example, as shown in FIG. 12, the number of the second electrode plates 120 is 25, and the number of the first electrode plates 110 is 12, that is, the number of channels of the touch structure 100 is 37.

In some embodiments, the length of the edge of the second electrode plate 120 is in a range of 4.05 mm to 4.15 mm or in a range of 4.15 mm to 4.2 mm. For example, the length of the edge of the second electrode plate 120 may be 4.05 mm, 4.1 mm, 4.12 mm or 4.17 mm.

In some embodiments, the areas of the sensing surfaces 103 of the plurality of second electrode plates 120 are the same, and the area of the sensing surface 103 of the sixth irregular electrode plate 111c, the area of the sensing surface 103 of the seventh irregular electrode plate 112c, and the area of the sensing surface 103 of the eighth irregular electrode plate 113c are all the same as the area of the sensing surface 103 of the second electrode plate 120.

Figure 13:
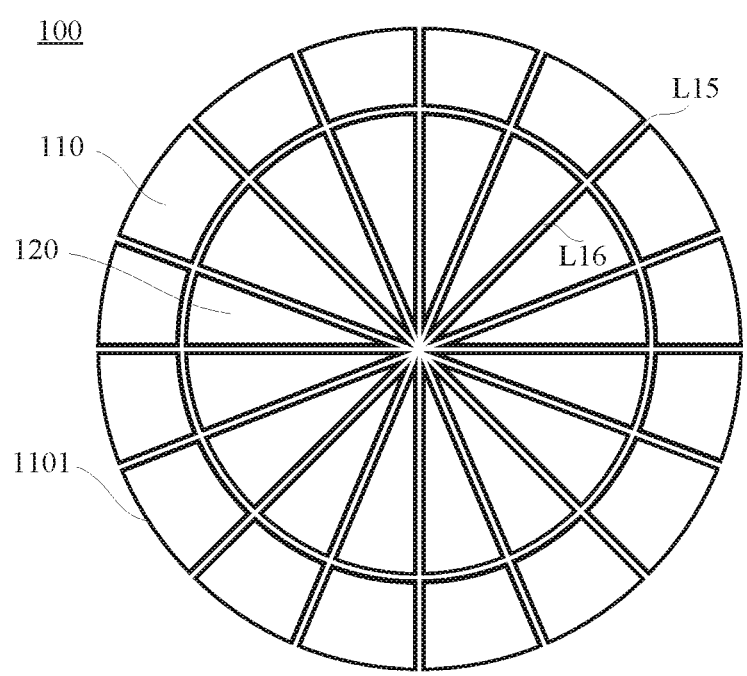
FIG. 13 is a structural diagram of yet another touch structure, in accordance with some embodiments.

FIG. 13 is a structural diagram of yet another touch structure 100 in accordance with some embodiments. It can be seen from the above that, in some embodiments, an orthographic projection of the second electrode plate 120 on the virtual reference plane M is in a shape of a polygon. In some other embodiments, as shown in FIG. 13, the first electrode plate 110 is in a range of a ring sector, and the second electrode plate 120 is in a range of a sector.

It can be understood that the ring sector is a part of a ring. A longer one of two arc edges of the ring sector is the designated edge 1101 of the first electrode plate 110. In this way, the ring sector-shaped first electrode plates 110 and the sector-shaped second electrode plates 120 may form a circular touch region 102, thereby improve the convenience of the arrangement of the first electrode plates 110 and the second electrode plates 120.

In some embodiments, the area of the sensing surface 103 of the ring sector-shaped first electrode plate 110 is the same or approximately the same as the area of the sensing surface 103 of the sector-shaped second electrode plate 120.

In some embodiments, as shown in FIG. 13, there is a fifteenth gap L15 between two adjacent ring sector-shaped first electrode plates 110, and there is a sixteenth gap L16 between two adjacent sector-shaped second electrode plates 120. The fifteenth gap L15 and the sixteenth gap L16 are located on the same straight line, which may further improve the regularity of the structure of the touch structure 100.

Figure 14:
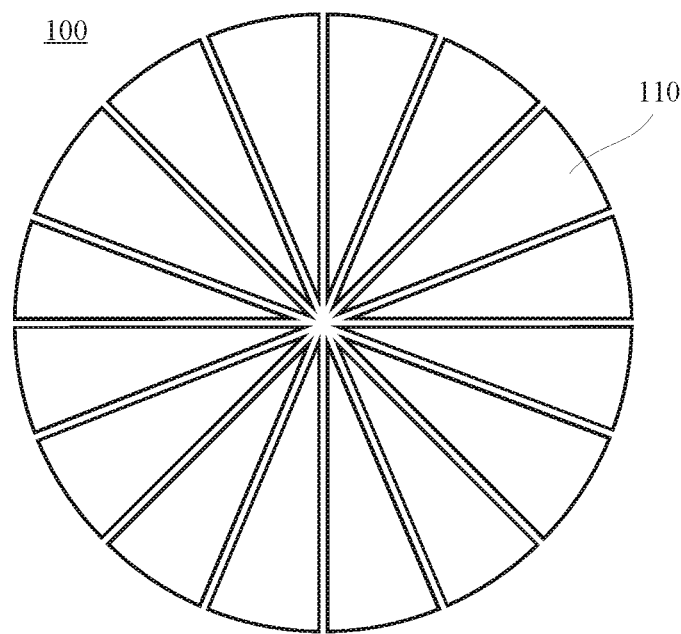
FIG. 14 is a structural diagram of yet another touch structure, in accordance with some embodiments.

FIG. 14 is a structural diagram of yet another touch structure 10 in accordance with some embodiments. It can be seen from the above that, in some embodiments, the electrode plates 101 include a plurality of first electrode plates 110 and a plurality of second electrode plates 120. In some other embodiments, as shown in FIG. 14, the electrode plates 101 include a plurality of first electrode plates 110, and the plurality of first electrode plates 110 are each in a shape of a sector.

It can be understood that the electrode plates 101 include the plurality of first electrode plates 110, and the plurality of first electrode plates 110 are each in the shape of the sector, so that the convenience of the arrangement of the first electrode plates 110 may further be improved, and the structure of the plurality of electrode plates 101 may be simplified, which is convenient for the plurality of first electrode plates 110 to form a circular touch region 102. In some embodiments, the sensing surfaces 103 of the plurality of first electrode plates 110 have the same areas.

In some embodiments, each electrode plate 101 has the same area.

It can be understood that the areas of all the electrode plates 101 may be completely the same, or may be approximately the same. Setting each electrode plate 101 to have the same area may further ensure the uniformity of electrical signals output by different electrode plates 101, thereby improving the accuracy and reliability of the touch structure 100.

In some embodiments, the plurality of electrode plates 101 are distributed centrally and symmetrically.

It can be understood that the plurality of electrode plates 101 are distributed centrally and symmetrically, so that the regularity of the arrangement of the plurality of electrode plates 101 may be improved, thereby improving the convenience of detecting the electrical signals output by the plurality of electrode plates 101, and further ensuring the accuracy of the touch position detected by the touch structure 100.

Moreover, the plurality of electrode plates 101 being distributed centrally symmetrically may also facilitate the arrangement of the plurality of electrode plates 101, thereby further improving the production efficiency of the touch structure 100 and reducing the production cost of the touch structure 100.

In some embodiments, the touch region 102 is circular.

It can be understood that arranging the touch region 102 as a circle enables the touch structure 100 to meet the use requirements of different touch display apparatuses 200, thereby improving the applicability of the touch structure 100.

Figure 15:
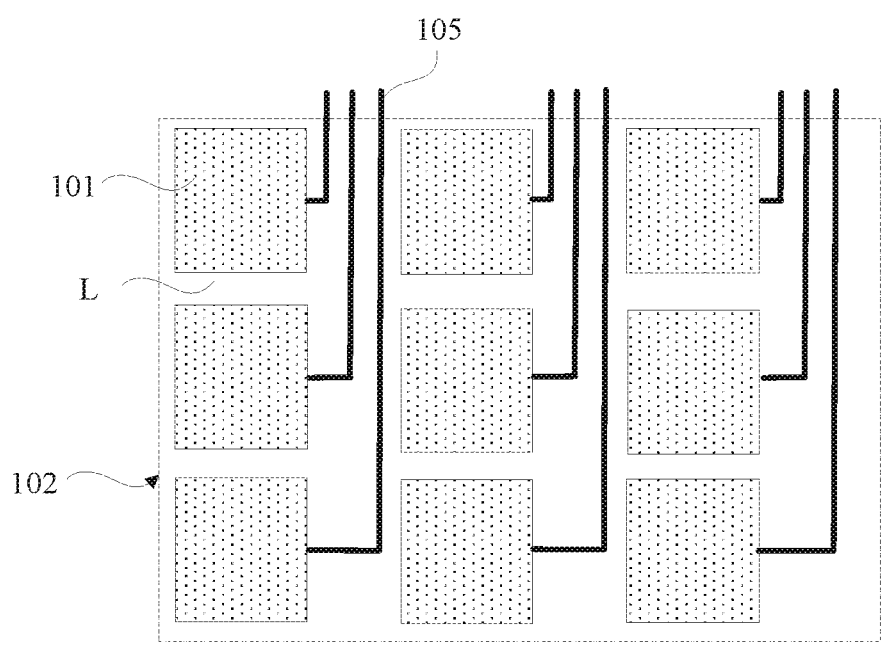
FIG. 15 is a structural diagram of touch leads, in accordance with some embodiments.
Figure 16:
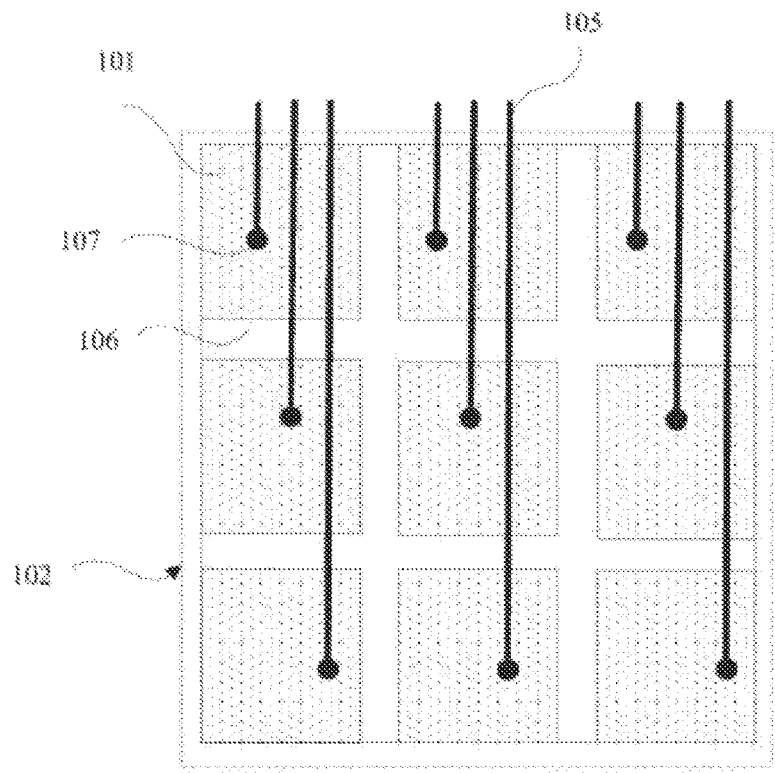
FIG. 16 is a structural diagram of other touch leads, in accordance with some embodiments.
Figure 17:
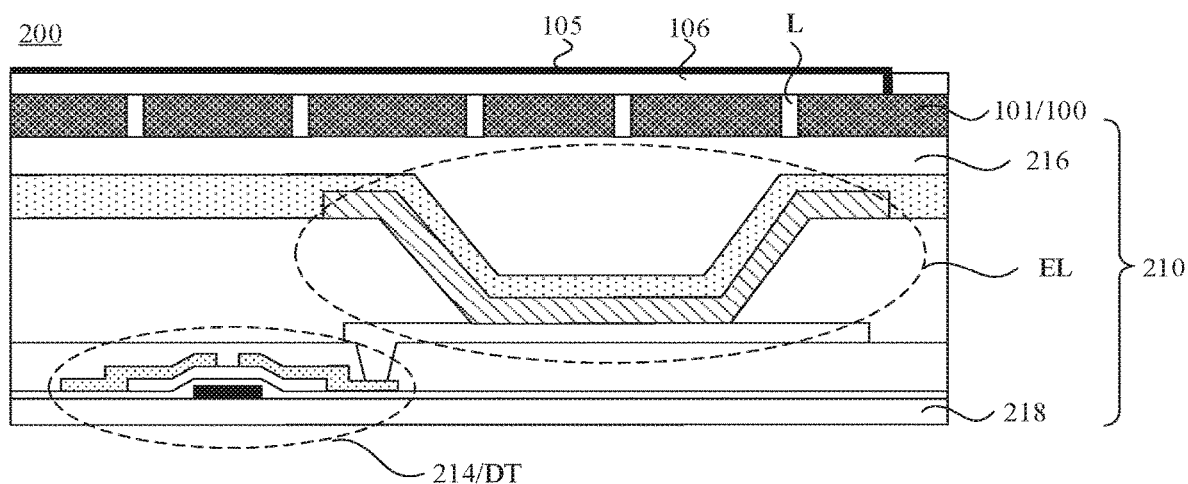
FIG. 17 is a structural diagram of yet another touch display apparatus, in accordance with some embodiments.

FIG. 15 is a structural diagram of touch leads 105 in accordance with some embodiments. FIG. 16 is a structural diagram of other touch leads 105 in accordance with some embodiments. FIG. 17 is a structural diagram of yet another touch display apparatus in accordance with some embodiments. The touch leads 105 in some embodiments of the present disclosure will be described exemplarily below with reference to FIGS. 15 to 17.

In some embodiments, as shown in FIG. 15, the touch structure 100 further includes a plurality of touch leads 105, and a touch lead 105 is electrically connected to an electrode plate 101.

It can be understood that, the touch lead 105 is used to transmit an electrical signal. In some embodiments, the material of the touch lead 105 may be metal or other non-metallic conductors.

It can be seen from the above that the electrode plate 101 can convert the touch position into the electrical signal. In this way, the touch lead 105 is electrically connected to the electrode plate 101, so that the electrical signal converted by the electrode plate 101 can be transmitted outside through the touch lead 105, and thus the touch structure 100 may realize the position detection function.

In some embodiments, the touch lead 105 may also be electrically connected to a touch IC, so that the touch IC can obtain the electrical signal converted by the electrode plate 101 through the touch lead 105.

In some embodiments, as shown in FIG. 15, the plurality of touch leads 105 are led out to the outside of the touch region 102 along the gaps L between the plurality of electrode plates 101.

It can be understood that the plurality of touch leads 105 are led out to the outside of the touch region 102 along the gaps L between the electrode plates 101, not only may the influence of the touch leads 105 on the capacitance value of the electrode plates 101 be avoided, but also the images displayed on the display surface may be avoided being blocked by the touch leads 105, thereby further improving the reliability of the touch structure 100.

In some other embodiments, as shown in FIG. 16, the touch structure 100 further includes an insulating layer 106. It can be understood that, as shown in FIG. 17, the insulating layer 106 is disposed on a side of the electrode plates 101 away from the substrate 218.

In some embodiments, the insulating layer 106 may be made of an insulating material such as transparent resin, so as to prevent the insulating layer 106 from blocking the images displayed on the display surface.

The insulating layer 106 is located between the plurality of electrode plates 101 and the plurality of touch leads 105. The insulating layer 106 is provided with a plurality of via holes 107 therein. It can be understood that the via holes 107 penetrate the insulating layer 106 in a direction perpendicular to the insulating layer 106. A touch lead 105 is electrically connected to an electrode plate 101 through at least one via hole 107. In this way, as shown in FIGS. 16 and 17, the touch lead 105 can be led out to the outside of the touch region 102 through the via hole 107.

By providing the insulating layer 106, the insulating layer 106 may electrically isolate the touch leads 105. Therefore, not only may the influence of the touch leads 105 on the capacitance value of the electrode plates 101 be avoided, but also the images displayed on the display surface may be avoided being blocked by the touch leads 105, thereby further improving the reliability of the touch structure 100.

In addition, providing the via holes 107 in the insulating layer 106 realizes the electrical connection between the touch lead 105 and the electrode plate 101, and may also prevent the touch lead 105 from occupying the gap L between two adjacent electrode plates 101, and thus the width of the gap L may further be reduced to improve the reliability of the touch structure 100.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch structure, comprising:
   a plurality of electrode plates, the plurality of electrode plates being located on a same virtual reference plane, and each electrode plate having a sensing surface; a smallest enclosed pattern region where a whole of the plurality of electrode plates is located being a touch region; wherein
   the plurality of electrode plates include a plurality of first electrode plates, each first electrode plate has a designated edge, and the designated edge constitutes a part of a boundary of the touch region; at least one designated edge is arc-shaped; and
   an area of a sensing surface of each first electrode plate is in a range of 10 mm$^2$ to 35 mm$^2$.

2. The touch structure according to claim 1, wherein the plurality of electrode plates further include:
   a plurality of second electrode plates located on a side of the plurality of first electrode plates away from the boundary of the touch region; an area of a sensing surface of each second electrode plate is in a range of 10 mm$^2$ to 40 mm$^2$.

3. The touch structure according to claim 2, wherein a ratio of the area of the sensing surface of the first electrode plate to the area of the sensing surface of the second electrode plate is in a range of 0.6 to 1.5.

4. The touch structure according to claim 3, wherein the ratio of the area of the sensing surface of the first electrode plate to the area of the sensing surface of the second electrode plate is in a range of 0.95 to 1.05.

5. The touch structure according to claim 2, wherein an orthogonal projection of each second electrode plate on the virtual reference plane is in a shape of a polygon.

6. The touch structure according to claim 5, wherein the plurality of first electrode plates include:
   a first irregular electrode plate including a first arc edge, a first edge and a second edge, and the first arc edge being a designated edge of the first irregular electrode plate; wherein the first edge of the first irregular electrode plate is connected to an end of the first arc edge, the second edge of the first irregular electrode plate is connected to another end of the first arc edge, an end of the first edge of the first irregular electrode plate away from the first arc edge is connected to an end of the second edge of the first irregular electrode plate away from the first arc edge, and the first edge of the first irregular electrode plate is perpendicular to the second edge of the first irregular electrode plate; and
   a second irregular electrode plate disposed adjacent to the first edge of the first irregular electrode plate, wherein the second irregular electrode plate and the first edge of the first irregular electrode plate have a first gap therebetween; and
   each second electrode plate is in a shape of a square, and the plurality of second electrode plates include:
   a first square electrode plate disposed adjacent to the second edge of the first irregular electrode plate; and
   a second square electrode plate disposed adjacent to both the first square electrode plate and the second irregular electrode plate, wherein the second square electrode plate and the first square electrode plate have a second gap therebetween, and the second gap and the first gap are located on a same straight line.

7. The touch structure according to claim 6, wherein an area of a sensing surface of the first irregular electrode plate is smaller than an area of a sensing surface of the second irregular electrode plate.

8. The touch structure according to claim 6, wherein a length of an edge of each second electrode plate is in a range of 3.17 mm to 6.32 mm.

9. The touch structure according to claim 5, wherein the plurality of first electrode plates include:
   a third irregular electrode plate including a second arc edge, a first edge and a second edge, and the second arc edge being a designated edge of the third irregular electrode plate; wherein the first edge of the third irregular electrode plate is connected to an end of the second arc edge, the second edge of the third irregular electrode plate is connected to another end of the second arc edge, and a direction in which the first edge of the third irregular electrode plate extends is perpendicular to a direction in which the second edge of the third irregular electrode plate extends;
   a fourth irregular electrode plate disposed adjacent to the first edge of the third irregular electrode plate; and
   a fifth irregular electrode plate disposed adjacent to the second edge of the third irregular electrode plate.

10. The touch structure according to claim 9, wherein each second electrode plate is in a shape of a square, and a length of an edge of each second electrode plate is in a range of 5 mm to 6 mm.

11. The touch structure according to claim 9, wherein the third irregular electrode plate further includes a third edge and a fourth edge; the third edge of the third irregular electrode plate is connected to an end of the first edge of the third irregular electrode plate away from the second arc edge, and the fourth edge of the third irregular electrode plate is connected to an end of the second edge of the third irregular electrode plate away from the second arc edge; an end of the third edge of the third irregular electrode plate away from the first edge of the third irregular electrode plate is connected to an end of the fourth edge of the third irregular electrode plate away from the second edge of the third irregular electrode plate, and the third edge of the third irregular electrode plate is perpendicular to the fourth edge of the third irregular electrode plate; and
   the plurality of second electrode plates include:
   a first rectangular electrode plate disposed adjacent to the third edge of the third irregular electrode plate;
   a second rectangular electrode plate disposed adjacent to the fourth edge of the third irregular electrode plate; and
   a third square electrode plate disposed adjacent to both the first rectangular electrode plate and the second rectangular electrode plate.

12. The touch structure according to claim 11, wherein a length of the third edge of the third irregular electrode plate is the same as a length of an edge of the first rectangular electrode plate proximate to the third irregular electrode plate, and a length of the fourth edge of the third irregular electrode plate is the same as a length of an edge of the second rectangular electrode plate proximate to the third irregular electrode plate.

13. The touch structure according to claim 11, wherein an area of a sensing surface of the third square electrode plate is smaller than an area of a sensing surface of the first rectangular electrode plate, and the area of the sensing surface of the third square electrode plate is smaller than an area of a sensing surface of the second rectangular electrode plate.

14. The touch structure according to claim 9, wherein an area of a sensing surface of at least one first electrode plate is the same as an area of a sensing surface of at least one second electrode plate.

15. The touch structure according to claim 5, wherein the plurality of first electrode plates include:
   a sixth irregular electrode plate including a third arc edge, a first edge and a second edge, and the third arc edge being a designated edge of the sixth irregular electrode plate; wherein the first edge of the sixth irregular electrode plate is connected to an end of the third arc edge, the second edge of the sixth irregular electrode plate is connected to another end of the third arc edge, and the first edge of the sixth irregular electrode plate is parallel to the second edge of the sixth irregular electrode plate;
   a seventh irregular electrode plate disposed adjacent to the first edge of the sixth irregular electrode plate; and
   an eighth irregular electrode plate disposed adjacent to the second edge of the sixth irregular electrode plate.

16. The touch structure according to claim 15, wherein each second electrode plate is in a shape of a square, and a length of an edge of each second electrode plate is in a range of 4 mm to 4.2 mm.

17. The touch structure according to claim 2, wherein the first electrode plates are each in a shape of a ring sector, and the second electrode plates are each in a shape of a sector.

18. The touch structure according to claim 1, wherein the plurality of first electrode plates are all in sector shapes.

19. The touch structure according to claim 1, the touch structure further comprising:
   a plurality of touch leads, a single touch lead being electrically connected to a single electrode plate; wherein
   the plurality of touch leads are led out to outside of the touch region along gaps between the plurality of electrode plates; or
   the touch structure further comprising:
   a plurality of touch leads, a single touch lead being electrically connected to a single electrode plate; and
   an insulating layer disposed between the plurality of electrode plates and the plurality of touch leads in a direction perpendicular to the virtual reference plane; wherein the insulating layer is provided with a plurality of via holes therein, and the single touch lead is electrically connected to the single electrode plate through at least one via hole.

20. A touch display apparatus, comprising:
   a display panel; and
   the touch structure according to claim 1 disposed on a display surface of the display panel.

* * * * *